United States Patent
Marshall et al.

(10) Patent No.: US 7,117,229 B2
(45) Date of Patent: Oct. 3, 2006

(54) METHOD AND SYSTEM FOR ONLINE REORGANIZATION OF DATABASES

(75) Inventors: Brian J. Marshall, Napa, CA (US); Mark D. Henderson, Thousand Oaks, CA (US); Milton I. Bailey, Carrollton, TX (US); Timothy R. Bruce, Carrollton, TX (US); Roger J. Rogala, Napa, CA (US); Wendy A. Webster, Boulder, CO (US); Donald F. Metzner, Lyons, CO (US); Peter J. Dres, Soquel, CA (US)

(73) Assignee: Computer Associates Think, Inc., Islandia, NY (US)

( * ) Notice: Subject to any disclaimer, the term of this patent is extended or adjusted under 35 U.S.C. 154(b) by 176 days.

(21) Appl. No.: 10/159,613

(22) Filed: May 31, 2002

(65) Prior Publication Data

US 2003/0135478 A1    Jul. 17, 2003

Related U.S. Application Data

(60) Provisional application No. 60/294,811, filed on May 31, 2001.

(51) Int. Cl.
   *G06F 17/00*    (2006.01)
(52) U.S. Cl. ...................... 707/200; 707/202; 707/204; 707/206

(58) Field of Classification Search ......... 707/200–206
   See application file for complete search history.

(56) References Cited

U.S. PATENT DOCUMENTS

| 6,070,170 | A | * | 5/2000 | Friske et al. ................. 707/202 |
| 6,411,964 | B1 | * | 6/2002 | Iyer et al. .................... 707/200 |
| 6,460,048 | B1 | * | 10/2002 | Teng et al. ............. 707/103 R |
| 2002/0065792 | A1 | * | 5/2002 | Bonner et al. ................. 707/1 |

OTHER PUBLICATIONS

Lakhamraju et al, "On-line reorganization in object databases", ACM 2000, pp. 58-69.*

* cited by examiner

*Primary Examiner*—Uyen Le
(74) *Attorney, Agent, or Firm*—Baker Botts L.L.P.

(57) ABSTRACT

A system and method for online reorganization of an existing database that occurs while read and update activity of the existing database continues. The system and method comprise unloading the existing database, reloading the existing database directly to a shadow database, building shadow database indexes, creating a first intermediary image copy of the existing database, analyzing the existing database, capturing updates for the existing database, applying the captured updates to the shadow database, taking the existing database offline, finalizing the shadow database with any remaining updates, creating a final image copy, comparing the existing database and the finalized shadow database, and placing the finalized shadow database online.

15 Claims, 16 Drawing Sheets

METHOD AND SYSTEM FOR ONLINE REORGANIZATION OF DATABASES

REFERENCE TO RELATED APPLICATIONS

This Application claims the benefit of Provisional Application Ser. No. 60/294,811, filed May 31, 2001, the contents of which are herein incorporated by reference.

BACKGROUND

1. Field

The present disclosure relates to databases. More specifically, the present disclosure relates to a method and system for online reorganization of database systems.

2. Description of the Related Art

Hierarchical database systems such as the IBM Information Management System (IMS) are well-known and widely used systems. A hierarchical database consists of records connected with each other via links in a tree-like logical structure. A record is a collection of field values that provide information relating to an entity or a relationship instance. Records of the same type can be grouped into record types which can be given a name and its structure can be defined by a collection of named fields or data items. A parent-child relationship exists between two record types in a 1:N relationship. For example, FIG. 16 shows an example of a hierarchical database 10 with three record types and two parent-child relationship types. The record types 12 are Department, Employee and Project. The parent-child relationship types 14 are (Department, Employee) and (Department, Project). Although not shown, the field names, further specifying the data in each record type, can be displayed under each record type in the diagram. FIG. 15 shows an IMS database (DB) structure. Components of database 20 include Multiple Virtual Storage (MVS) data sets 22, database description (DBD) 24, and Job Control Language (JCL) 26. JCL is a means of communicating with the IBM MVS Operating System. JCL statements provide information that the operating system desires to execute a job (unit of work). MVS data sets DS1 and DS2 (22) hold byte strings B1 and B2, respectively. Mapping of byte strings B1 and B2 is defined by DBD. JCL may be correctly set up to tie the MVS data sets 22, holding the DB byte strings, to the DBD. Failure to do so may lead to non-recoverable DB errors. Each byte string has a unique relative base address (RBA). Other MVS copies of byte strings B1 and B2 may be made. Copies on tape or Direct Access Storage Device (DASD) data sets that are not named via any DBD and JCL are Image Copies (IC).

When a transaction is performed such that data is added, updated and/or deleted from the database, the data may become disorganized or fragmented. When this occurs, response time to database queries can be compromised. Accordingly, many systems provide a method of reorganizing the data so that the related data can be physically grouped together. This makes access to the data faster and more efficient. Accordingly, performance of the database can be improved by reorganization. Reorganization may also reclaim previously unusable space in the database. However, conventional systems take the database offline for reorganization.

In today's eBusiness world, critical IMS data may be available as close to 100% of the time (i.e., 24 hours per day, seven days per week) as possible. The opportunity to take IMS databases offline for maintenance activities such as reorganization is thus fast disappearing. However, unless the databases are periodically reorganized, the efficiency and effectiveness of the database system decreases as access times increase and databases run out of space.

Therefore, there is a problem in that when reorganizing an IMS database, there is a significant amount of outage or downtime which the customer incurs. There is an increasing desire to reduce this outage or downtime. Conventional systems may make extra copies of the database in order to reorganize it and accomplish reorganization in multiple job steps, which may add significantly to the downtime.

SUMMARY

The present disclosure in one embodiment provides a system and method for online reorganization of an existing database. A method for online reorganization of an existing database that occurs while read and update activity of the existing database continues may include unloading the existing database, reloading the existing database to a shadow database, building shadow database indexes, capturing updates for the existing database, applying the captured updates to the shadow database, taking the existing database offline, finalizing the shadow database with any remaining updates when the existing database is taken offline, and placing the finalized shadow database online. The existing database may be directly reloaded to the shadow database so that there is no intermediary file. A first intermediary image copy of the existing database may be created when the existing database is directly reloaded to the shadow database. The method may further include analyzing the existing database when creating the first intermediate image copy of the existing database, creating a final image copy of the existing database when the shadow database is finalized, unloading the existing database and the finalized shadow database, comparing the existing database to the finalized shadow database, and placing the finalized shadow database online when the finalized shadow database matches the existing database.

A computer-implemented method for online reorganization of an existing database that occurs while read and update activity of the existing database continues may include unloading the existing database, reloading the existing database to a shadow database, building shadow database indexes, capturing updates for the existing database, applying the captured updates to the shadow database, taking the existing database offline, finalizing the shadow database with any remaining updates when the existing database is taken offline, and placing the finalized shadow database online. The existing database may be directly reloaded to the shadow database so that there is no intermediary file. A first intermediary image copy of the existing database may be created when the existing database is directly reloaded to the shadow database. The method may further include analyzing the existing database when creating the first intermediate image copy of the existing database, creating a final image copy of the existing database when the shadow database is finalized, unloading the existing database and the finalized shadow database, comparing the existing database to the finalized shadow database, and placing the finalized shadow database online when the finalized shadow database matches the existing database.

Computer software for online reorganization of an existing database that occurs while read and update activity of the existing database continues, the computer software residing on a computer-readable medium and may include instructions for causing a computer to unload the existing database, reload the existing database to a shadow database, build shadow database indexes, capture updates for the existing database, apply the captured updates to the shadow database, take the existing database offline, finalize the shadow database with any remaining updates when the existing database is taken offline, and place the finalized shadow database online. The existing database may be directly reloaded to the shadow database so that there is no intermediary file. The computer software may further include instructions for causing a computer to create a first intermediary image copy of the existing database when the existing database is directly reloaded to the shadow database, analyze the existing database when creating the first intermediate image copy of the existing database, create a final image copy of the existing database when the shadow database is finalized, unload the existing database and the finalized shadow database, compare the existing database to the finalized shadow database, and place the finalized shadow database online when the finalized shadow database matches the existing database.

A computer-readable medium including computer executable code for performing online reorganization of an existing database that occurs while read and update activity of the existing database continues may include code for unloading the existing database, code for reloading the existing database to a shadow database, code for building shadow database indexes, code for capturing updates for the existing database, code for applying the captured updates to the shadow database, code for taking the existing database offline, code for finalizing the shadow database with any remaining updates when the existing database is taken offline, and code for placing the finalized shadow database online. The may be directly reloaded to the shadow database so that there is no intermediary file. The computer-readable medium including computer executable code may include code for creating a first intermediary image copy of the existing database when the existing database is directly reloaded to the shadow database, code for analyzing the existing database when creating the first intermediate image copy of the existing database, code for creating a final image copy of the existing database when the shadow database is finalized, code for unloading the existing database and the finalized shadow database, code for comparing the existing database to the finalized shadow database, and code for placing the finalized shadow database online when the finalized shadow database matches the existing database.

BRIEF DESCRIPTION OF THE DRAWINGS

The features of this disclosure can be more readily understood from the following detailed description by referring to the accompanying drawings wherein.

DETAILED DESCRIPTION

In describing preferred embodiments of the present disclosure, specific terminology is employed for sake of clarity. However, the present disclosure is not intended to be limited to the specific terminology so selected and it is to be understood that each specific element includes all technical equivalents which operate in a similar manner.

The present disclosure provides online reorganization of databases by use of an online reorganization system and method. The present disclosure provides a system and method that allows reorganization of databases such as IMS databases while allowing read and update activity to continue. In this way, data availability is maximized.

The system and method may be implemented in the form of a software application running on a computer system such as a mainframe, personal computer (PC), handheld computer, etc. The computer system may be linked to the database. The link may be, for example, via a direct link such as a direct hard wire or wireless connection, via a network connection such as a local area network, or via the Internet. The system and method may be integrated into or separate from a database reorganization package. For example, the system and method may be integrated with a Database Administration Tool (DBA), Database Organizer (DBO), Database Copier (DC), Secondary Index Builder (SIB), etc.

Figure 1:
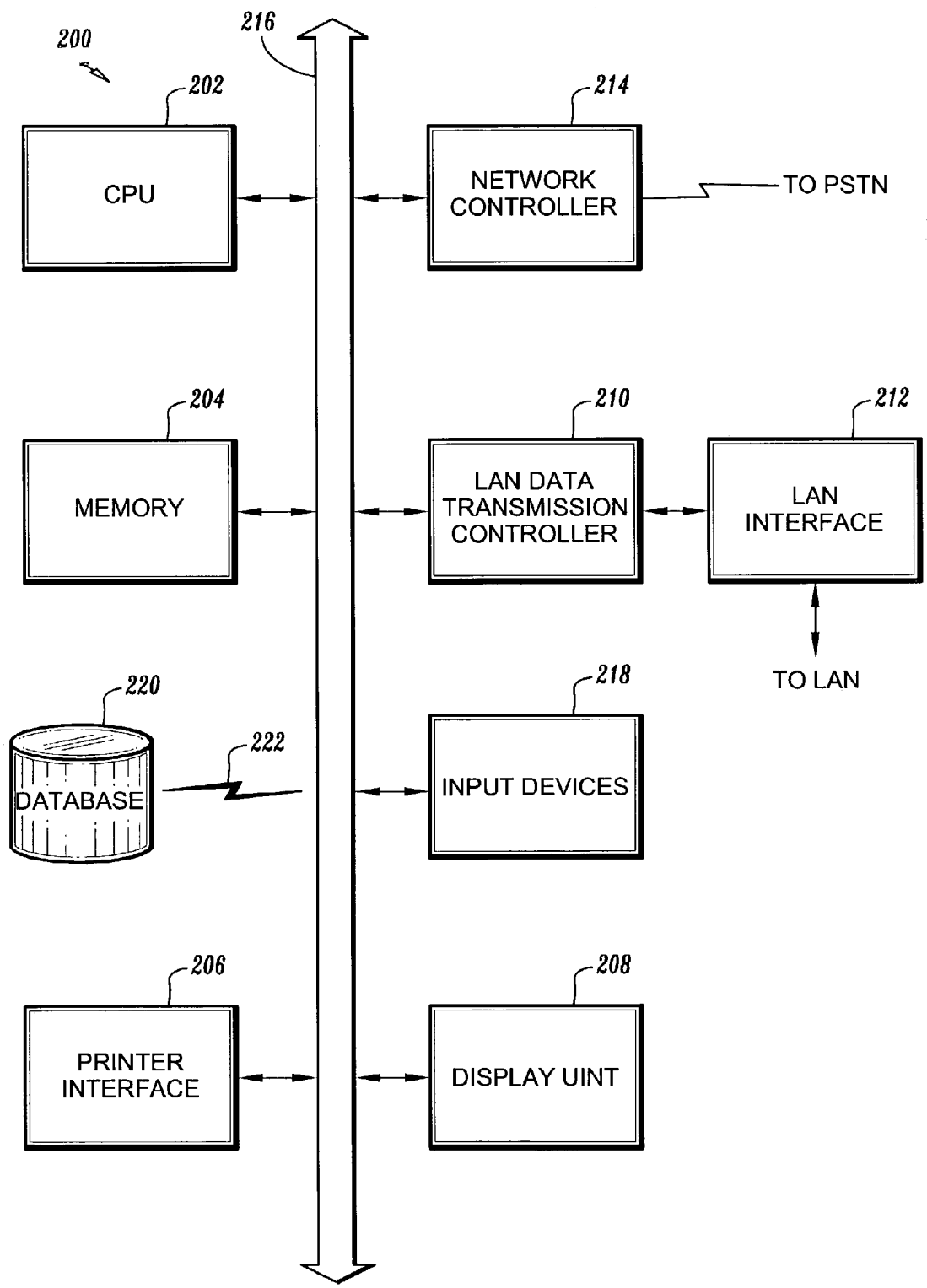
FIG. 1 shows a system according to one embodiment of the present disclosure for implementing online reorganization of IMS databases.

An example of a computer system capable of implementing the system and method is shown in FIG. 1. The computer system referred to generally as system 200 may include a central processing unit (CPU) 202, memory 204, a printer interface 206, a display unit 208, a LAN (local area network) data transmission controller 210, a LAN interface 212, a network controller 214, an internal bus 216 and one or more input devices 218 such as, for example, a keyboard, mouse, etc. As shown, the system 200 may be connected to a database 220 via a link 222.

Figure 2:
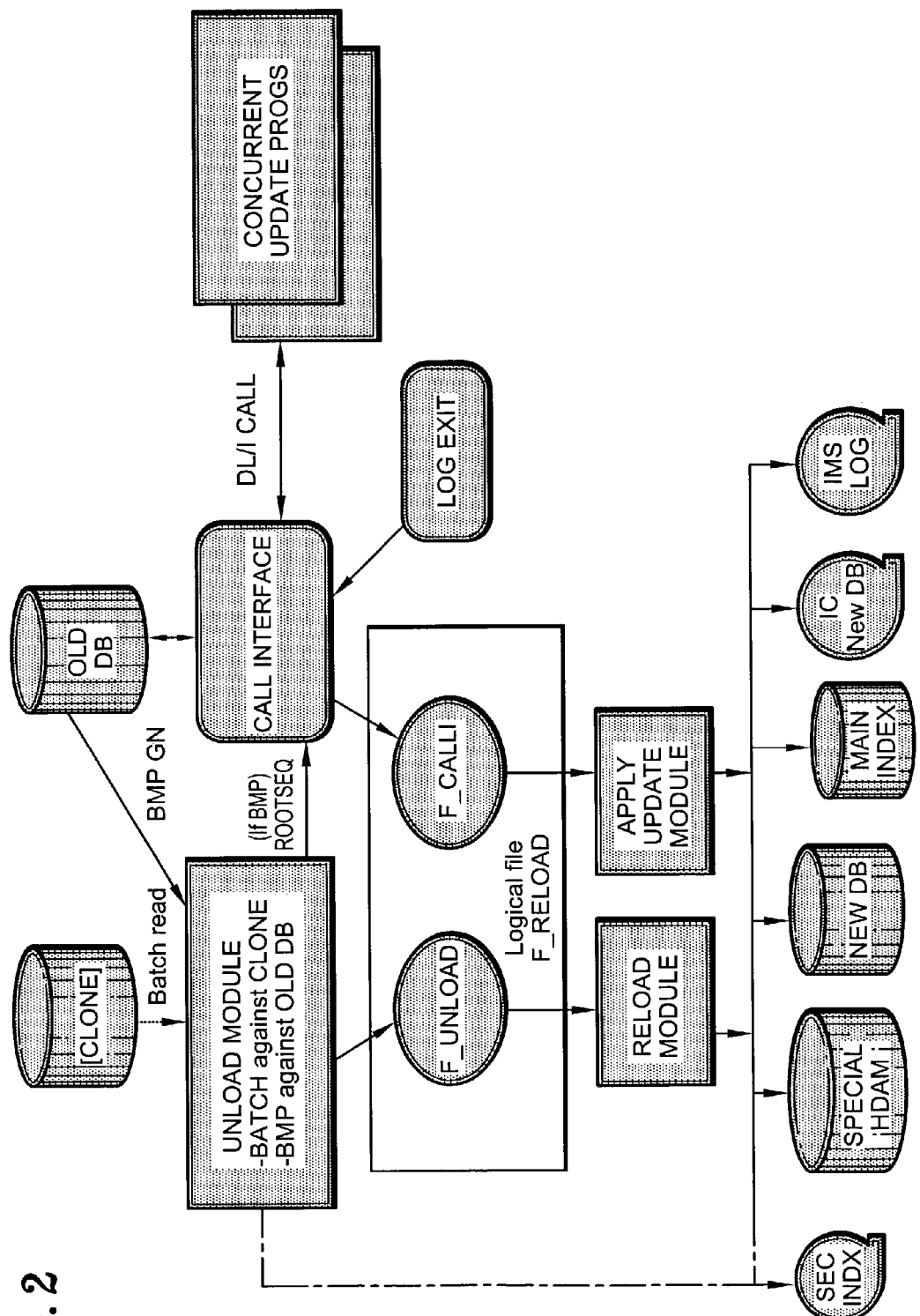
FIG. 2 shows an overview according to one embodiment of the present disclosure of the online reorganization system.

A general overview of the system and method follows with reference to FIG. 2. The present disclosure in one embodiment provides a method and system for direct reload of a database to a shadow database while it is being unloaded so that there is no intermediary file. That is, in one embodiment, a direct or concurrent reload process can be used whereby as the online database is unloaded, each segment of the database can be passed from the unload process directly into the reload process.

A transaction is a set of input data that triggers execution of a specific process or job, or a message destined for an application program. A transaction may not always complete its process successfully. Such an incomplete transaction may compromise the integrity of data in the database. Accordingly, any incomplete transactions may be aborted and the database returned to the state as it existed prior to execution of the transaction in question. Rollback refers to such a restoration of a database to a state as it existed previously. A transaction that successfully completes its processing is said to be committed. A committed transaction makes changes permanent and leaves the database in a new consistent state. A log is a history of all of the changes that have been made to a database, and/or the status of each of the transactions performed on the database.

A database reorganization process may include updates of the database. According to the present disclosure, all updates to the database that occur during reorganization of the database can be captured and stored into data spaces for later replay to the new database. The updates can then be stored into the database while the reorganization is occurring. The database can be image copied after the reload to the shadow database is complete. Then, once all of the updates that have been captured into the data spaces have been replayed to the new database, a new Image Copy (IC) can be created. The new IC can then be registered to the database recovery controls (DBRC) via an Incremental Image Copy (IIC) process, for use as backup and/or for recovery purposes.

The IC is "as of" a point in time. For example, the IC may be created from the previous IC plus a log of physical changes that occurred to the previous image copy, where the previous IC is an exact copy of the database, and the log file contains all updates applied to the database that formed the IC. The DBRC may automatically track ICs and log files. All calls to the DBRC may be intercepted and all interfaces to the DBRC handled by the present system and method.

In one embodiment, the IIC can, at the user's option, be completed after the database is put back online, thereby reducing the offline time. The method may use the direct reload process for databases that have no segment edit/compression routines and a non-direct serial unload/reload for databases with segment edit/compression routines.

An IC as of the start of unload may be made, and serves two purposes: first as a source for unload, if batch message partition (BMP) unload is not used, and second as a backup in case something goes wrong.

The system and method of the present disclosure may also use a process of tracking all reorganization jobs and the updates to each, by way of a "Start" task that monitors all communications between tasks. This process tracks the database unload, reload, and image copy. The Start task is responsible for keeping statistics concerning the captured updates to the database, and for storing all of the captured updates to the database in data spaces until such time that they are applied to the new database. The Start task may also end the reorganization process if all updates are not removed from the data spaces.

The IIC process creates the final IC of the database. The IC of the shadow database is preferably taken after it has been reloaded. After all of the updates have been applied to the new shadow database, the system may take the log from the application of the updates, perform a Change Accumulation (CA) process on them and use the CA file and the IC from the reloaded shadow to create the new IC. The process of creating the final IC can be completed either before the new database is put back online or after, at the user's discretion.

The method and system of the present disclosure in one embodiment may use a "safetynet" feature which checks whether the old database and the new reorganized database have the same data. The purpose of the safetynet feature is to ensure a very high level of integrity in the new database. The safetynet feature unloads both the old database and the shadow database that is about to be put back online and compares them after the time stamp and relative byte addresses (RBAs) have been zeroed out. If the two are logically identical, the new shadow database is put online and the database is started. If they are not the same, an error message is issued relating to the difference and the old database is then put back online. This virtually guarantees that the online reorganization process has worked correctly. This feature may be set to be "on" all the time so that this safetynet process is performed for each reorganization, or may be made user selectable.

A Call Intercept (CI) is a process that captures database updates in support of the present system and method. A Log exit is a process responsible for tracking Commits and Roll Backs. The CI process and the Log exit process work in conjunction with the Start task in order to incorporate all of the correct updates into the database and to "roll back" updates that were not committed. "Sync point" and roll back events may be recorded in a file called F_CALLI, which is a file created by the CI process that acts as the system's call repository. These events can be used in conjunction with the database update events as captured via the CI process to apply database updates to the reorganized shadow database.

IMS uses a concept commonly referred to as a "logical unit of work." This means that database updates are performed within the context of a transaction, or as a logical subset of a transaction that is not dependent upon other subsets of the transaction. To ensure the overall integrity of a database, the database system may have the ability to logically relate multiple updates and to identify when these multiple updates can be "hardened" and considered complete. For example, if a catastrophic system error were to occur in the middle of an IMS transaction that is performing multiple database updates, the IMS system may be capable of "backing out" the updates made by that transaction at the time of the error.

Therefore, sync point events that represent the "hardening" of a transaction or logical unit of work can be located. Also, those situations where a simple transaction error has occurred, as opposed to a catastrophic system error can be located. If a simple transaction error has occurred, the updates made by the failing transaction may be backed out due to the fact that the transaction may not be able to complete successfully.

There are a number of IMS log records that may contain the information desired to determine where logical units of work have completed or may be rolled back. While the online reorganization process of the present disclosure does not desire to record all of the information found in each of these record types, parsing of the records of interest can be performed. Therefore, a common record format may be created to be written into the F_CALLI file. This record may contain only that information deemed to be desirable for properly identifying database commits and aborts (and/or backouts).

The present disclosure therefore provides a method which allows users to easily reorganize a database online to an IMS database management system (DBMS). An explanation of the system and method operation follows with reference to FIG. 3. In Step S1, initialization of the system occurs. This includes several steps to allow the system to determine what information is desired about the databases and where it can retrieve that information.

Figure 5:
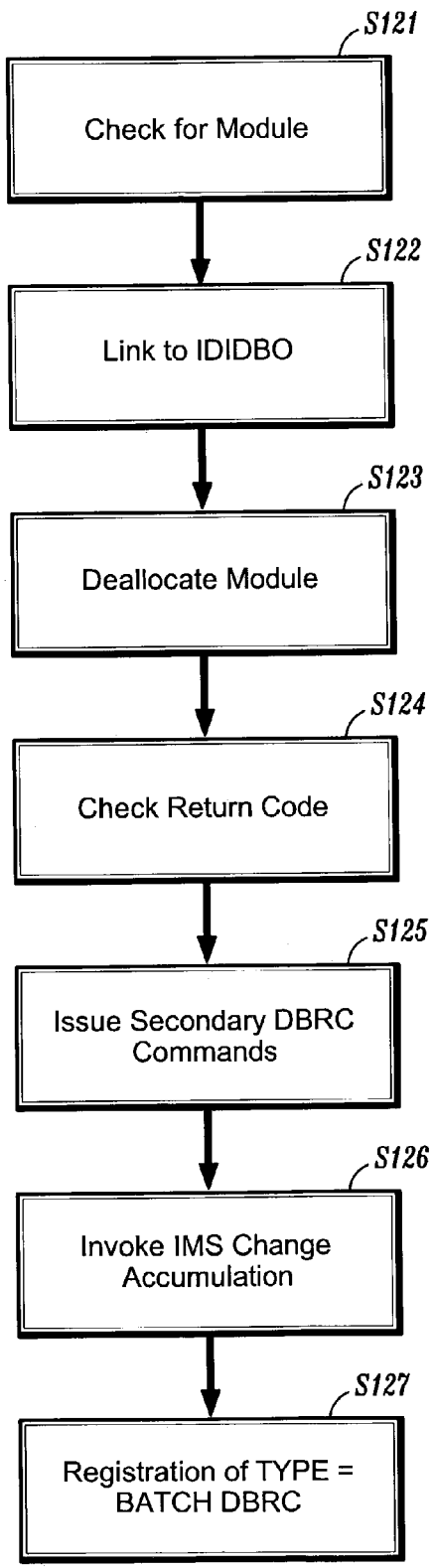
FIG. 5 is a flow chart of a method according to one embodiment of the present disclosure for producing a concurrent image copy of the database.

In Step S2 the existing database is unloaded and directly reloaded to a shadow database. A concurrent image copy (CIC) is made in Step S3 and the database is analyzed in Step S4. These steps may all be accomplished in parallel. FIG. 5 is a flowchart for describing the CIC creation step in more detail. The CIC is created from the previous IC with the IMS logs added to reflect the bitmap of the database to be reorganized. The CIC is unloaded to a file called e.g. F_UNLOAD. This file, however, may be missing some updates that occurred while it was being uploaded. These updates are applied to the file to result in a reloaded database with all updates.

In Step S5 shadow database indexes are built using an index building function. Each record of the database is processed and indexed accordingly. Updates are captured in Step S6 and as many of the updates as possible are applied to the shadow database in Step S7.

The old database is then taken offline in Step S8 and the shadow database is finalized with any remaining updates that may have occurred in the interim in Step S9. A final IC is created in Step S10 reflecting the shadow database with all updates. The CIC is updated with the log data sets created during Steps S7 and S9 to produce the final IC.

Step S11 optionally performs a logical comparison check of the old and new databases. The new database is then placed online in Step S12.

Figure 3:
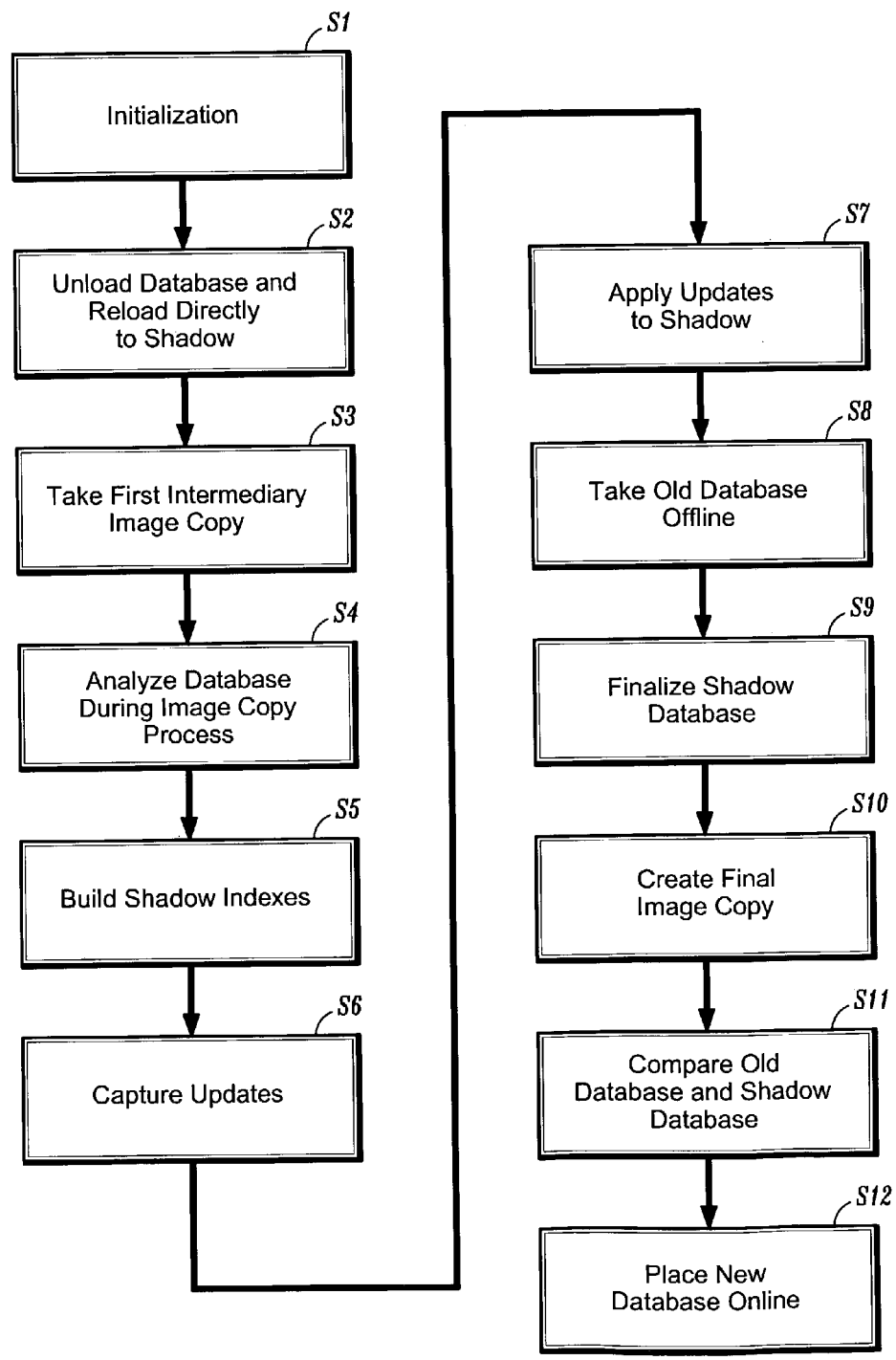
FIG. 3 is a flow chart of a method according to one embodiment of the present disclosure for online reorganization of IMS databases.
Figure 4:
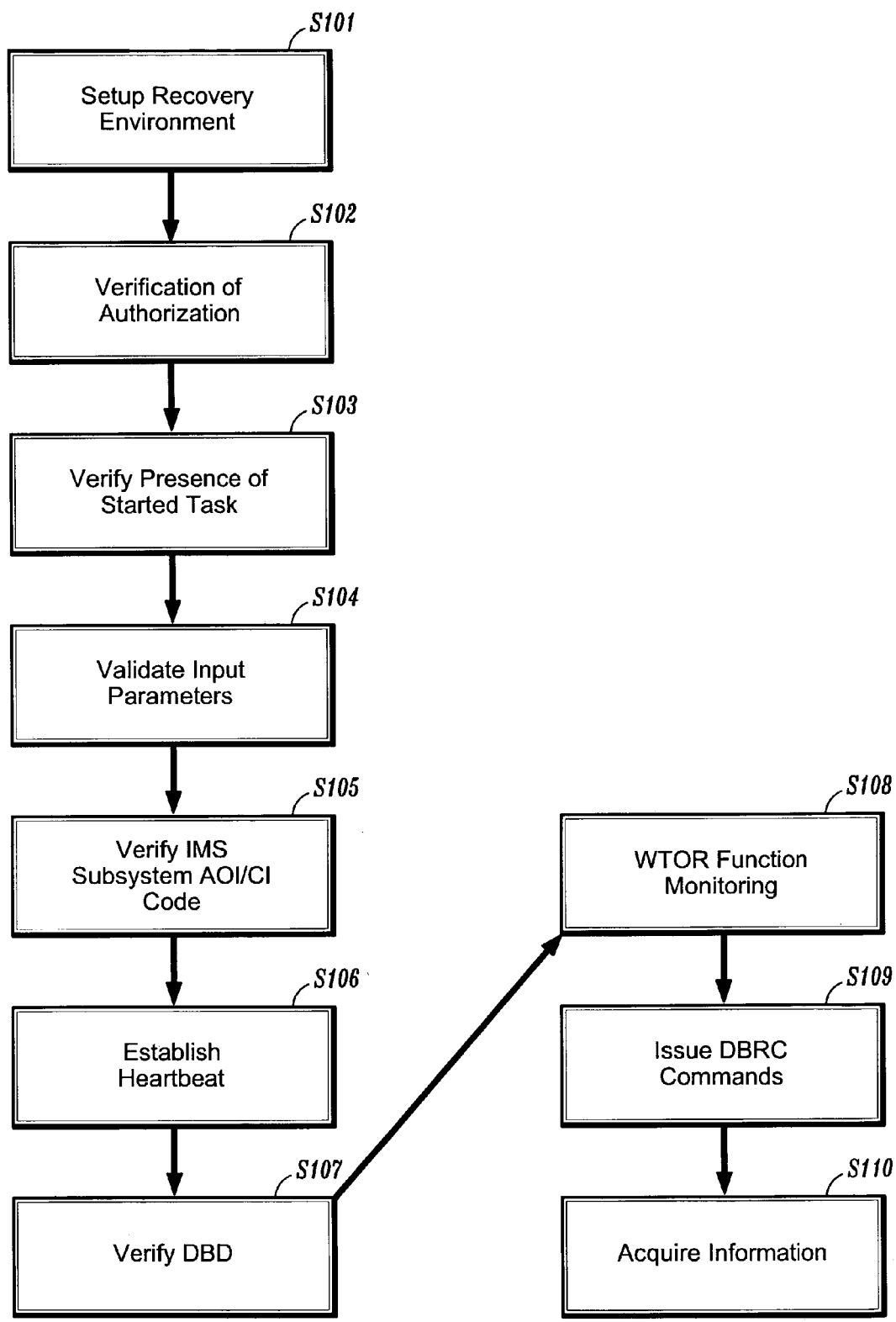
FIG. 4 is a flow chart of a method according to one embodiment of the present disclosure for initialization of the online reorganization of IMS databases.

FIG. 4 is a flowchart for describing the initialization step (Step S1) of FIG. 3 in more detail. In Step S101, the system sets up the recovery environment. In Step S102, the system verifies authorization and in Step 103, verifies the presence of the start task. The system input parameters are validated in Step 104. In Step S105, the required IMS subsystem containing automatic operator interface and call intercept system code is verified. A heartbeat is established in Step S106 between the IMS and this system code so a communication link between the two exists. The database description is verified in Step S107 against the active database. In Step 108, the system communicates to the operator to stop all BMPs using the database being reorganized. In Step 109, initial commands are issued to acquire information in Step 110 about the database to be reorganized.

FIG. 5 is a flowchart for describing the step for producing a CIC (Step S3) of FIG. 3 in more detail. In Step S121, the system checks for a module that contains Database Organizer control statements data sets. These user-specified control statements influence how the CIC is created. The module is linked to the Database Organizer function in Step S122. In Step S123, the module containing the control statements is deallocated and the return code is obtained from the function in Step S124. In Step S125, secondary database recovery control commands are issued (if necessary) to facilitate easier recovery of the database. A Change Accumulation process occurs in Step S126 that creates a compacted version of the log data sets by eliminating records not related to recovery, producing a final CIC. In Step S127 the finalized CIC is placed in database recovery control in preparation for recording updates and capturing log records.

Figure 6:
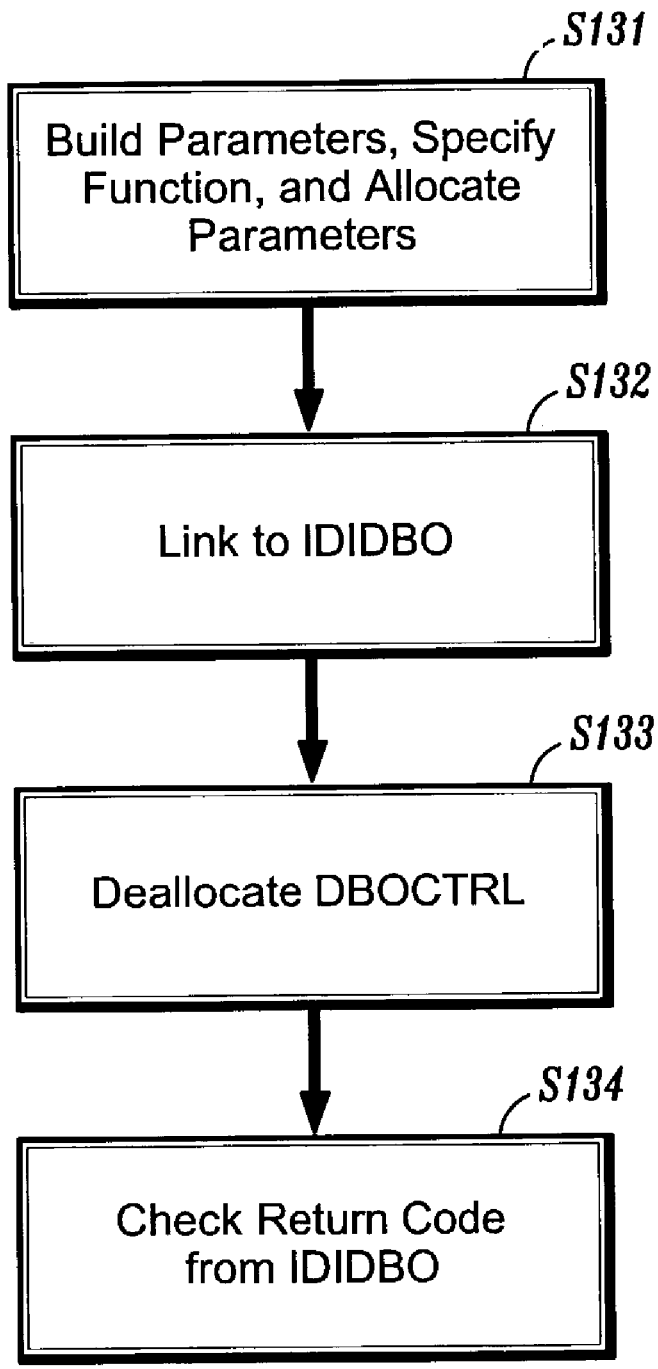
FIG. 6 is a flow chart of a method according to one embodiment of the present disclosure for unloading the concurrent image copy database.

FIG. 6. is a flowchart for describing the unload step (Step S2) of FIG. 3 in more detail. In Step S131, control statement input parameters and the unloading function are specified. The unload function is linked to the Database Organizer function and executed in Step S132. In Step S133, the module containing the control statements is deallocated and the return code is obtained from the function in Step S134.

Figure 8:
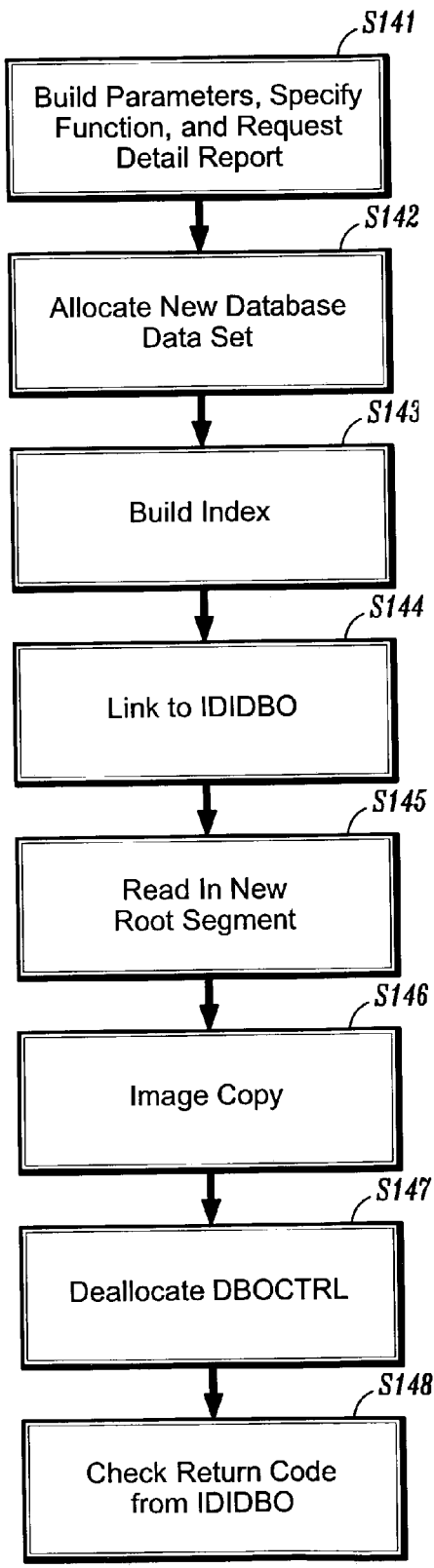
FIG. 8 is a flow chart of a method according to one embodiment of the present disclosure for the initial reload of the reorganized database.

FIG. 8 is a flowchart for describing the reload step (Step S2) of FIG. 3 in more detail. In Step S141, control statement input parameters and the reloading function are specified. In Step S142, new data sets are allocated for the shadow database. An index building function is used to build the shadow database indexes in Step S143. The reload function is linked to the Database Organizer function and executed in Step S144. In Step 145, a new root segment is read and the previous root is made available to the index building function to create secondary indexes. In Step S146, the CIC is created (FIG. 5). In Step S147, the module containing the control statements is deallocated and the return code is obtained from the Database Organizer function in Step S148.

Figure 9:
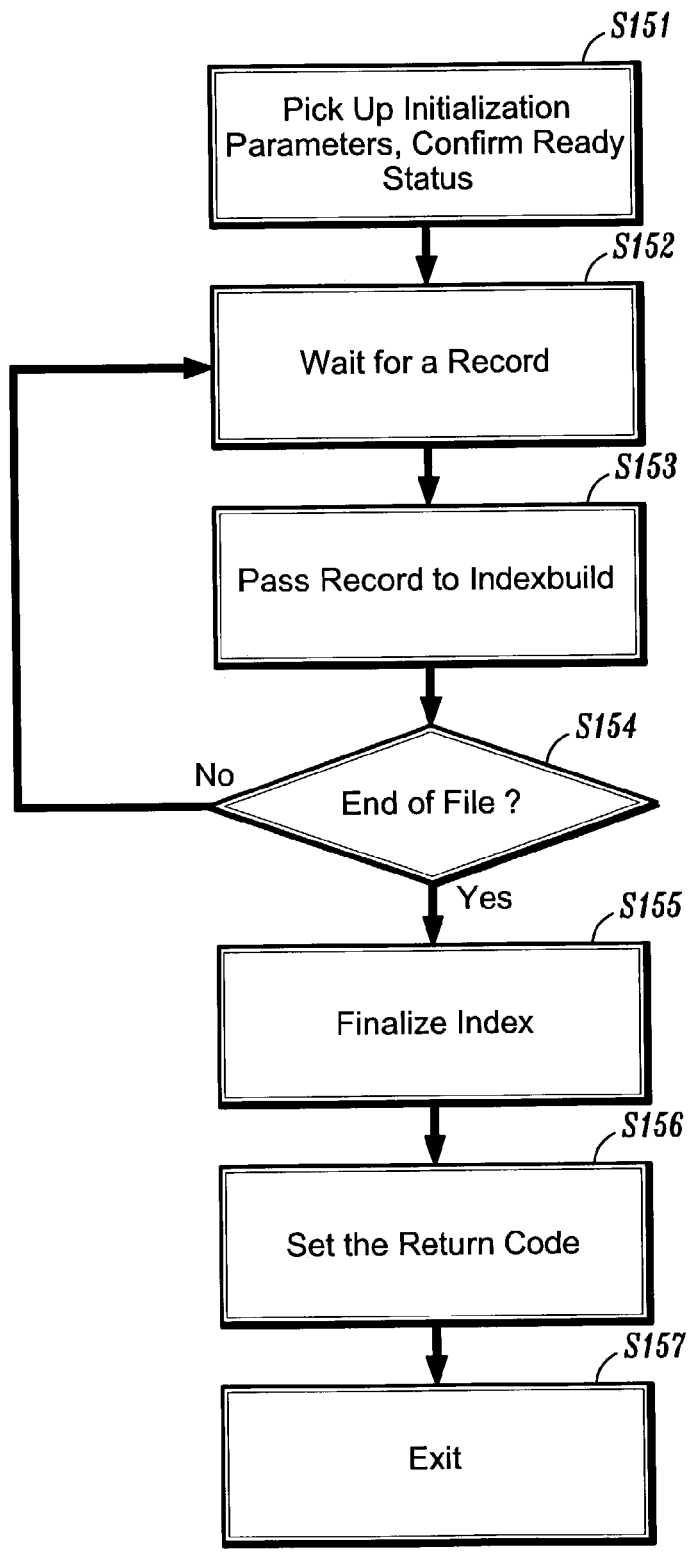
FIG. 9 is a flow chart of a method according to one embodiment of the present disclosure for building shadow database indexes.

FIG. 9 is a flowchart for describing the index building function in the shadow database index building step (Step S5) of FIG. 3 in more detail. In Step S151, the function picks up initialization parameters and confirms ready status. In Step S152, the function waits for a record. In Step S153, the record is indexed. This continues until an End Of File is signaled (no more records) in Step S154. The index is finalized in Step S155. The return code is obtained in Step S156 and the function exits in Step S157.

Figure 10:
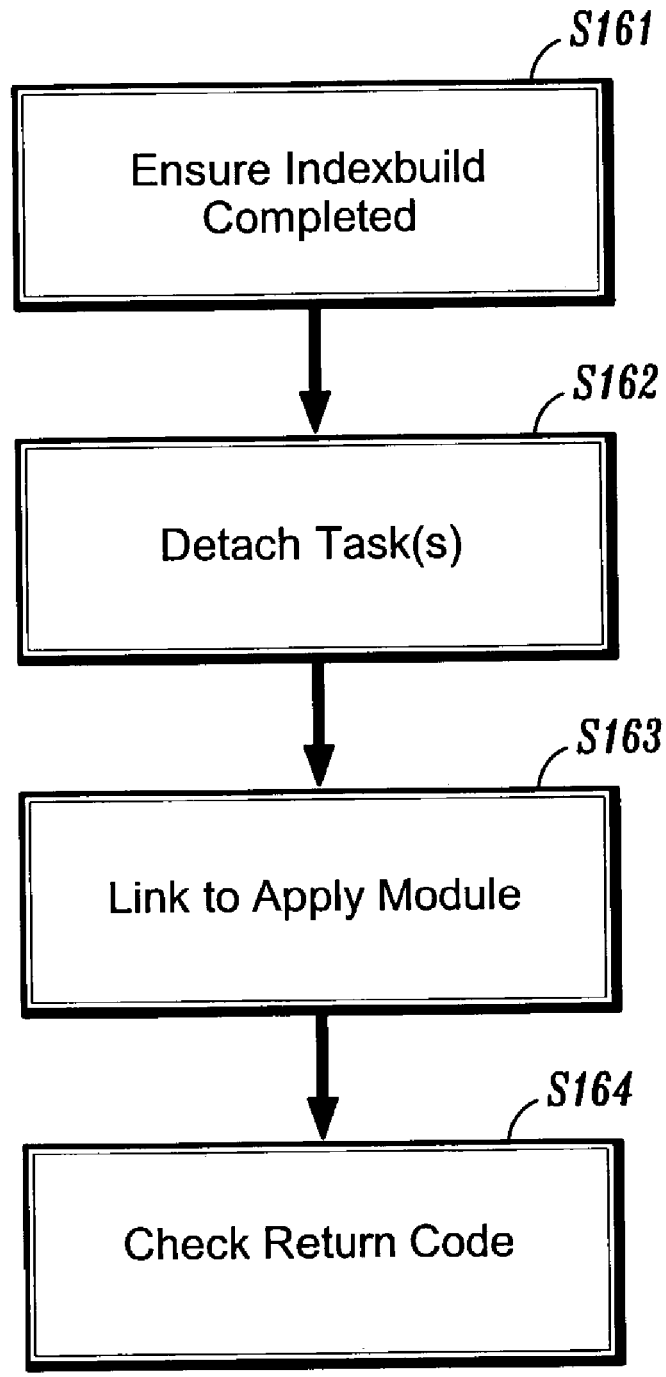
FIG. 10 is a flow chart of a method according to one embodiment of the present disclosure for applying (most) interim updates.

FIG. 10 is a flowchart for describing the applying updates to the shadow database step (Step S7) of FIG. 3 in more detail. In Step S161, the function confirms the shadow database indexes are complete and detaches task(s) in Step S162. In Step S163, a link to an apply function that reads a file repository called e.g. F_CALLI containing the captured updates along with a key for each indicating whether the update should be applied. The entries are applied accordingly or simply reloaded. The return code is obtained in Step S164.

System Installation Requirements

The system requirements are, for illustration purposes, generally as follows. An update to the IEAAPFnn member in IMS of SYS1.PARMLIB to authorize the system's load library is desired or using an MVS subsystem module such as SETPROG. An MVS subsystem entry may be dynamically created and named e.g. HPO1. This entry name may be changed via a zap or SMP/E usermod. At least one started task may be added to a JES-accessible PROCLIB. Sample job control language (JCL) is provided for two started tasks in the SMAPLIB data set in members BMPHPO and STCHPO. A program specification block (PSB) is generated for each database to be reorganized. The PSB control block describes databases and logical message destinations used by an application program. Each PSB generally includes three program communication blocks (PCBs) created in a specific sequence, for example: a) PCB created with PROCOPT=G that contains all database segments; b) PCB created with PROCOPT=G that contains a single SENSEG macro for the root segment with PROCOPT=K; and c) PCB created with PROCOPT=AP that contains all database segments. IMS is regenerated to include a PSB called HPOIO and all database PSBs created for use of the system described above. The load library is added to the STEPLIB concatenation in the IMS control region, ahead of the standard RESLIB data set. The IMS startup parameter (e.g. AOIS) is then set to an appropriate value (e.g. S) to allow the automated operator interface (AOI) BMP to execute ICMD.

DBRC Router

The system front-ends the DBRC router, DSPCRTR0. To function correctly, the system's load library may be properly loaded as described previously, and a copy of DSPCRTR0 may be made and named IBMCRTR0. When this is done, the system's router is invoked first. When finished it passes control to the original IBM DBRC router, IBMCRTR0.

JCL Requirements

The Job Control Language (JCL) requirements are, for illustration purposes, generally as follows. The program to be executed to perform an online database reorganization is referred to as IDIHPO or HPODB in this description. This program may require APF authorization and so, as per the system requirements described previously, the library in which the program is provided may be added to the system APF list.

DD Statements

The following DD statements shown in Table 1 are used in the system.

TABLE 1

DD Statements used by the system.

| DDNAME | Function |
| --- | --- |
| IEFRDER | IMS log data set created during interim update apply process. |
| DFSRESLB | IMS reslib. |
| DFSVSAMP | DL/I buffer pool control statements. |
| IMS | IMS dbdlib/psblib. |
| Database | Reorganized database data sets. |
| Odatabase | Original database data sets prefixed by OLDDDNAMEPREFIX. |
| Pindex | HIDAM primary index reorganized data sets. |
| Opindex | HIDAM primary index original data sets prefixed by OLDDDNAMEPREFIX. |
| Index@nn | Secondary index work data sets. The ddname comes from the first 5 bytes of the primary ddname, followed by the at sign (@), and a numerical suffix. For example, a database with a primary ddname of CUSDB that has two secondary indexes would require two ddnames of CUSDB@01 and CUSDB@02. |
| DBCCOPY1 | Transient database image copy. |
| NEWICOPY | Database image copy. |
| RECON1 | IMS recovery control data set 1. |
| RECON2 | IMS recovery control data set 2. |
| RECON3 | IMS recovery control data set 3. |
| DFSUCUMN | Database image copy. |
| SORTWKnn | Sort work data sets. |
| SYSOUT | Output from SORT. |
| IDIPARM | Parameter library. |
| HPOCTRL | System control statements. |
| STEPLIB | System load library. |

Control Statement Syntax

User parameters are preferably specified in IDI or AMS syntax to maintain consistency with the IMS system. Either option may be used, however each option may be used exclusively within a job step. All keywords and keyword values can be specified in lowercase or uppercase. However, the System keyword processor converts all lowercase alphabetic characters to uppercase before processing. If it is desirable to preserve lowercase alphabetic values, they can be coded as hex-type quoted strings.

IDI Syntax

Control statements are entered in free format. One or more keywords and the associated values can be placed on each control statement. The first non-blank position in each record is considered the start of the specifications for that statement. The first blank following the start of the specifications on a record indicates that the rest of the statement is comments.

Continuation records are indicated by entering any character in position 72 of the record or by ending a statement's specifications with a trailing comma. Each keyword and its associated value may be contained completely on a single control statement. a keyword of value cannot be continued on a subsequent statement. Comment statements may be entered by inserting an asterisk (*) in column 1 preceding the comment.

AMS Syntax

The control data set contains 80-character fixed length records. Each control statement consists of a single command whose syntax rules are similar to those of Time Sharing Option (TSO) or Access Method Services. A command consists of a command with optional parameters and comments, separated where desirable with separators and continued to the following line with continuation characters if desirable. Commands may be entered anywhere in positions 1 through 72 of the input statement (positions 73 through 80 are ignored).

System Parameters

The system may preferably have its own keyword table to control processing as shown in Table 2. It may also utilize values from existing products, such as DBDNAME.

Table 2. System Keyword Parameters

TABLE 2

System Keyword Parameters

| Keyword | Description | Value[1] |
| --- | --- | --- |
| BMP | Specifies name of AOI BMP task. An MVS START command is issued against this operand to activate the task | No Default |
| DBDNAME | Specifies name of database to be reorganized | No Default |
| FUNCTION | Type of reorganization to be performed | <u>REORG</u> |
| AUTOSWAP | Makes freshly-reorganized database available to IMS automatically | <u>YES</u> NO |
| OLDDDNAMEPREFIX | Specifies prefix for DD names under which original databases may be allocated | No Default |
| REORGACCESS | Specifies type of user access to the database being reorganized during reorganization | NONE READ <u>UPDATE</u> |
| IMSSSID | MVS subsystem ID of the IMS control region | Default pulled from DFSVC000 |
| LOGSWITCH | Specifies whether a switch of the IMS log may be enforced at the end of reorganization | <u>YES</u> NO |
| SAFETYNET | Specifies whether integrity checking of the reorganized database is performed | YES <u>NO</u> |
| PSB | Specifies the name of the PSB to be used for applying interim updates | No Default |

[1]Default values are underlined.

Passing values to Database Organizer (DBO) and Database Administration (DBA) Tool involves use of the DBO control statements (DBOCTRL) and DBA control statements (DBACTRL) data sets, respectively. DBOCTRL is read by DBO when it is invoked to perform the concurrent image copy (CIC) described below. The user can specify the DBOCTRL parameters to influence the CIC but if the ddcard is omitted, a suitable input stream may be built and written to a dynamically allocated data set. DBACTRL may be read by DBA when it is invoked for database analysis during the IC process. The user can specify the DBACTRL parameters to influence the database analysis but if the ddcard is omitted a suitable input stream may be built and written to a dynamically allocated data set.

System Installation

Installation begins with adding the system load library as described previously. This may allow activation of the system's four distinct pieces of code—the partner product user exit routine, log exit, call intercept (CI) and automated operator interface (AOI).

Partner Product User Exit—DFSPPUE0

The partner product user exit routine (e.g. DFSPPUE0) is a special piece of code dispatched by IMS during system initialization that is principally used for activating the log exit, CI, and the AOI. DFSPPUE0 integrates with the DC Monitor Extensions (DCM) product by calling DCMPPUE0, if present. It is preferable to have a second copy of this module available. If DFSPPUE0 is already in use, the system's version of DFSPPUE0 may be called or the current version may be renamed to HPOPPUE0.

Logger Exit—DFSFLGX00

IMS provides for an IMS Logger Exit in the form of a customer or vendor supplied load module DFSFLGX0. The log exit module is an exit invoked for initialization and termination events, as well as for every write to the IMS system log. The use of this exit by the system may address the issue of supporting an existing user or third-party supplied Logger exit module. Further, due to the fact that the IMS logging facility is an element in the overall performance of IMS, special care may be taken to ensure that the presence of the system's IMS Logger Exit does not degrade performance.

There may no doubt be situations where a system candidate is already using the IMS Logger Exit for other purposes. Since IMS does not provide support for a list of exits to be called at this exit point, the system Logger Exit may address this situation by either building support for driving other Logger Exit routines directly into the system Logger Exit, with user-defined parameters to identify existing Logger Exit routine(s) according to names set by the customer; or by renaming any existing Logger Exit (DFSFLGX0) during system installation to a pre-determined, system-defined name (e.g. HPOFLGX0) and building support into the system Logger Exit to call the existing exit under its new name.

The first approach would involve building directly into the system Logger Exit an ability to call one or more customer-defined Logger Exit modules as specified by system configuration parameters. This approach would eliminate the need for the customer to maintain Logger Exit source code to support this requirement, but would conversely require system parameters in support of this feature.

The second (and preferred) approach would also eliminate the need for the user to maintain source for a Logger Exit, and would eliminate the need for system parameters to support this capability as well. It would, however, require that the system install process rename any existing Logger Exit to a system-specific module name that would be loaded and called by the system Logger Exit routine. Further, uninstall procedures for the system may either automatically rename this module back to DFSFLGX0, or may at a minimum procedurally direct the user to do so. By documenting the system-specific module name for user or third party supplied exits, such an exit could be installed after the system has been installed by simply making the exit available under the system-defined name. The user may select the load module that corresponds to the IMS release level being used, for example HPOFLGXCT for IMS 4.1, HPOFLGXD for IMS 5.1, or HPOFLGXE for IMS 6.1.

If a system module having one of these names is available during the initialization call, its entry point address may be stored in a storage available to each call of the Logger Exit routine (the 256-byte work area passed to this exit in GPR0 upon entry to the exit). The system Logger Exit may get an additional 256-byte work area, storing this address in the IMS provided work area as well. The system Logger Exit may then call, for example, the HPOFLGX0 module with an initialization call, passing the internally obtained work area address to the HPOFLGX0 module with an initialization call.

Each time the system Logger Exit is called, it may look in the IMS work area for an entry point address for HPOFLGX0. If an entry point has been set, the system exit may call this entry point, passing its internally obtained work area instead of the IMS work area address.

Note that the IBM documentation (SC26-3067) indicates that information placed in this internally obtained work area may be preserved across subsequent calls to the Logger Exit, the exceptions being across an IMS restart or "takeover." Across IMS restarts, the Logger Exit may be called again with an initialization call, allowing the system to rediscover the existence of an HPOFLGX0 module. A remote takeover, however, may not cause the Logger Exit to be called with another initialization call. Therefore, in addition to the HPOFLGX0 entry point address and the address of the internal work area, an eye catcher value may be placed in the IMS work area as well. This eye catcher value may be set on an initialization call, and checked on all subsequent call types. If this eye catcher value is not found in the work area, the system Logger Exit may assume that it may handle an implied initialization call to properly configure the work area and check for the HPOFLGX0 module.

Due to the potential impact to IMS performance, it would be desirable to dynamically add and remove the system Logger Exit routine (DFSFLGX0). However, there are no supported facilities for dynamically adding and removing the IMS Logger Exit in real-time. Therefore, the system Logger Exit may always be active. For this reason, there may be a very fast and efficient mechanism for the system Logger Exit in determining whether or not it is required to capture log events.

More specifically, the system Logger Exit may always get control. For initialization and termination calls to the Logger Exit, the system exit may always perform requisite initialization and termination tasks respectively. This may, for example, include loading and unloading one or more extraneous (user or third party) IMS Logger Exit modules to be called by the system Logger Exit.

The only call that may require the system Logger Exit to determine whether or not it may capture log events is the OLDS/SLDS Write Call to this exit. For this call type, there may be a mechanism (that may not cause a wait) to determine whether data is to be captured out of the log. If an online reorganization is not underway, the system Logger Exit may quickly determine this and simply return to the caller (or call user or third party logger exits if that approach is taken). If a reorganization is underway, and data capture is active, the Logger Exit may also quickly make this determination and perform log data capture for specific IMS log records as required by the system.

The main function of log exit DFSFLGX0 is to watch for x'37' and x'38' log records to denote user synchronization point (sync point) and rollback events. If there is a failure and recovery (rollback) is desirable, the sync point is a point in time from which IMS or the system can start over. Sync points in IMS are system checkpoints; system sync points are commit points.

IMS uses a commonly used concept of a "logical unit of work." This means that database updates are performed within the context of a transaction, or as a logical subset of a transaction that is not dependent upon other subsets of the transaction. To ensure the overall integrity of a database, it is desirable that a database system include the ability to logically relate multiple updates and to identify when these multiple updates can be "hardened" and considered complete. For example, should a catastrophic system error occur in the middle of an IMS transaction that is making multiple database updates, the IMS system may be capable of backing out the updates made by that "in-flight" transaction at the time of the error.

It is desirable to determine in the system Logger Exit those sync point events that represent the "hardening" of a transaction or logical unit of work, as well as those situations where a simple transaction error has occurred (as opposed to a catastrophic system error), where the updates made by the failing transaction may be backed out due to the fact that the transaction may not be able to complete successfully.

There are a number of IMS log records that may contain the information used to determine where logical units of work have completed or may be rolled back. While the system may not need to record all of the information found in each of these record types, parsing of the records of interest to the Logger exit is simple enough to fit into the overall requirement that the Logger exit not adversely affect IMS performance. Therefore, a simple, common record format may be created by the system Logger exit to be written to the F_CALLI repository to give full integrity to recording interim database updates. This record may contain only that information deemed to be desirable for properly identifying database commits and aborts (or backouts).

Call Intercept (CI)—HPODDLE0, HPODDL00, and HPODLA00

The CI modules perform all update, delete and insert work on behalf of an IMS system and collect information on updates being done to an online database while it is in the process of being reorganized. This information is also preferably stored in the call repository file F_CALLI. These modules may be specific to the release of IMS in use.

The CI load modules (e.g. HPODDLE0, HPODDL00, and HPODLA00) front end the corresponding DFS-prefixed load modules, for example DFSDDLE0 (insert), DFS-DDL00 (replace/delete), and DFSDLA00 (call analyzer). These modules are written to possess the same attributes as the IMS equivalents (mainly re-entrant and addressing mode 31) except that they may reside above the line since they do not invoke any OS access method. These routines are sensitive to the path length added to the IMS calls since they may not always be present. They reside in an authorized library. They invoke the appropriate IMS module to perform the intercepted call and on completion collect call information as desired for running systems.

This implementation allows for collecting all information desired to reconstruct maintenance requests for the APPLY function to apply concurrent updates to the reorganized database that occurred during unload when all segments are defined with unique sequence fields. Due to time constraints, collection of get requests may not be implemented to satisfy reconstruction of maintenance requests for non-uniquely keyed segments. This can be implemented later by additionally providing the replacement of the retrieve module DFS-DLR00.

The intercept of DFSDLA00 to capture user-defined partial rollbacks (ROLS) calls may be added since the log record seen by the log exit at the time the exit is invoked does not contain enough information to identify the records to be backed out.

In an IMS online environment, call analyzer module DFSDLA00 executes in the control region while insert module DFSDDLE0 and replace/delete module DFSDLD00 execute in the control region for a database/data communication (DB/DC) system or in the Data Language/I (DL/I) system or in the DL/I Separate Address Space (DLISAS) for a CICS/DBCTL system or when Local Storage Option (LSO) of S is specified. Batch IMS and CICS Local DL/I may not be supported. These modules are entered in primary mode, but the access registers can be nonzero. The data areas and control blocks accessed by these modules along with the modules themselves operate in protected, key-7 storage (e.g. sp=231) except for DLISAS where modules are loaded into the private area. The data collected by these modules represent physical segment data.

For proper installation, library concatenation of the IMS PROCLIB procedure is modified to include the system authorized load library for the DLISAS region and the IMS control region. The system library is not included in the procedure for the DCCTL type of control region (only DBCTL or DB/DC is supported). The partner product user exit routine DFSPPUE0 is provided to load the CI modules, save the IMS routine addresses, replace the IMS routine addresses, and indicate in the system subsystem control block for this IMSID that the call intercept has successfully been installed.

A number of functions could be performed in either the CI or the Apply module, including Dropping Null Calls, Building and maintaining the stack, and Using and maintaining the XREF table. It is up to implementation to decide exactly how to split these functions across CI and Apply. However, by placing the dropping and stack logic in the CI the size of the F_CALLI file can be greatly reduced. The preferred embodiment is having all three functions reside in CI, and Apply reads a fully edited and sequenced F_CALLI file.

It may be desirable to capture GHU calls, to obtain data before REPL or DLET. Gxx calls preceding a non fully SSA qualified ISRT may be captured either for positioning data and/or hash checking. Not all intercepted DB change calls should be passed to Apply. Calls may be dropped for application logic or IMS physical reasons.

If IMS rejects the call (discovered by looking at returned status code) then the call may be dropped. This may be true if, as planned, the system may run all Apply calls against a generic unrestricted PCB for that DB. An example would be an operator without authority to update a certain segment, who attempts an update. In some implementations this operator may not be able to activate a program that attempted such an update. However, depending on how applications are designed, and how security is implemented, it may be possible that a partly generic application program routed the call to a PCB that blocked the access. Another example is a plain programming error, caught by IMS. In either case if the update were attempted later using a generic PCB, it would get applied to the new DB. Thus such status failures may be filtered out. The converse would be that the Apply program may never see a rejected call. If something is wrong, the reorganization may be aborted.

If the Unload runs off an IC, then none of the concurrent updates may be seen by Unload, and all may be replayed. If Unload goes against the DB being updated it may be necessary to consider the ROOTSEQ of the record in which the update occurs. Assuming its value (which either the Call Intercept or Apply may obtain) is ROOTupt. At the time of the Call Intercept the current value of the record being unloaded may be read (available in the Unload module). Assume this is ROOTunld. Then ROOTupt is not equal ROOTunld, as locking prevents this. If ROOTupt<ROOTunld, then old version of record has been unloaded. Thus update may be applied later. If ROOTupt>ROOTunld, then update record may be unloaded later. Thus update may be ignored.

The Call Intercept module may discover ROOTKEY, either directly or via RBA XREF lookup. The Unload module may find ROOTKEY directly. As covered in IMS Keys and Sequences, ROOTSEQ can be computed given ROOTKEY and the DBD.

An intercepted ROLLx call may result in dropping of stacked calls back to some previous SETx. This may take place in the stack described next, but is a logical operation as the decision on what to drop is made by the application program performing the updates.

After all logical reasons for dropping a call have been taken into account, the remaining set may either be all applied or none may. The reasons for not applying requested changes are complex, however the system may need to consult the IMS log to discover the decision IMS made, and repeat that decision. The basic rule is that a set of updates may only be applied if a COMMIT record is logged for the set. A COMMIT record may be explicit, and until it is obtained the corresponding calls cannot be applied. Most ABORTs may also be indicated by explicit records. However there may be a number of implicit reasons for abort, e.g. application region fails, application region pseudo abended, e.g. for deadlock or DEDB check fail, application region times out, system or hardware failure. The system may ignore the last, as the reorganization would be abandoned. However it may make sure it recognizes the log records associated with other events, so it can correctly clear the stack.

Logically there may be a separate stack for each region, and stack processing described later applies to the individual stacks. In implementation it is possible that a single physical stack may be used, with records selected by region ID.

Call Intercept creates F_CALLI records for DLET, REPL, ISRT, SETx, positioning Gxx. Records that fail status code or ROOTSEQ test are dropped at once. Remaining records are placed in stack. If a ROLLx intercepted, delete all stacked records back to corresponding SETx. If ABORT (explicit or implicit), clear out all remaining records. If COMMIT from Log Exit, output to F_CALLI file all remaining records and clear stack. (Log Exit should only supply record after it is known to have been successfully written to DASD)

Because of the single threading within regions, and the sequencing of writing records to the physical log, the output sequence from the stack is the logical commit sequence.

Thus the F_CALLI file created can be read and used sequentially by Apply. This may automatically cause the single treaded Apply to apply the changes, to the new DB, in the correct logical sequence; even though they were originally applied to the old DB multi-threaded.

The logical sequence in which IMS updates primary and secondary indexes may be completely determined by the DB update sequence. As the DB replay sequence may be the same, the indexes may also be correctly updated.

Apply may require the segment name and PCBKEY for every change. This basic information may be obtained via the Call Intercept. The segment name is available at entry, and via some PSB field, at exit. There are various possibilities for obtaining PCBKEY: Call Intercept may keep a record of ongoing position change from previous calls. At the exit from a call, the actual PCBKEY that was used can be obtained from data in the PSB. At some change calls it may not be possible to locate the required PCBKEY. RBA may be available, in this case use may be made of an XREF table described below.

XREF Table

The initial table may be built from the already existing F_UNLOAD. Every Unloaded/Reloaded segment may have RBA_old and PCBKEY recorded. As updates are applied, Apply may maintain this table. REPL—No change. An update cannot change either RBA (even in a split) nor PCBKEY. DLET—Remove entry. ISRT—Add an entry. If fully SSA qualified ISRT, then full PCBKEY supplied in call. If only partially qualified, previous call may have established position on missing portion. This is an instance where Call Intercept may need to have created an F_CALLI record for a Gxx positioning call.

Automated Operator Interface (AOI)

The AOI is an IMS interface that allows the system to monitor and control IMS activities. The AOI load module DFSAOE00 may start the HPOAOPGM program. It monitors and issues IMS commands and messages, and communicates the results to HPOAOPGM. DFSAOE00 may look in the IMS Anchor block to see if this IMS is in reorganization mode. If not, it may ignore all traffic. A second copy of this module is also preferred.

The program HPOAOPGM executes as a BMP and is used to execute IMS commands. This module uses event control blocks (ECBs) in the IMS anchor block from the system SSCT and uses a wait function (e.g. AOIWAIT). Upon initialization the module may wait on the ECB for IDIHPO. IDIHPO communicates to this task by placing a request in the IMS anchor block and posting it the ECB. IDIHPO then waits on its ECB in this control block. HPOAOPGM posts the IDIHPO ECB when it has an answer. The first communication from IDIHPO is to establish the heartbeat. At that time HPOAOPGM sets the flag that IMS is in reorganization mode. HPOAOPGM issues the command for IDIHPO using ICMD and then uses AOIWAIT to wait for the response from DFSAOE00. When the response is received, HPOAOPGM notifies IDIHPO of the result.

Start Task (STC) Parameters

The STC parameters are coded in a member of the PARMLIB data set whose name matches the STC name. For example, if the STC name is SYSTEM then the member name may be SYSTEM. Table 3 describes the system STC parameters.

TABLE 3

System STC Parameters

| Parameter | Description |
|---|---|
| HPO_STARTUP | Identifies the normal system startup option. It is recommended to set to W (Warm), and override if desirable to C (Cold). A warm state may recover all CSA areas and SSI capabilities from previous system sessions since the last IPL. A Cold start builds new CSA areas and establishes a new SSI environment. A forced cold start (using this option) may result in system initialization attempting to free any CSA previously acquired by the system prior to initializing new CSA areas (the SSI areas are not recovered by a force cold start). |
| HPOALOG | Identifies the sysout class for the system activity log. |
| HPOCLOG | Identifies the sysout class for the system command log. |
| HPO_MAP_MODULE | Identifies the module name for the system mapping module (normally distributed as HPOMAP). If a module name other than the default (HPOMAP) is used, it may be indicated by this parameter. |
| HPO_REL_MODULE | Identifies the module name for the system control block relationship module (normally distributed as HPORELAT). If a module name other than the default (HPORELAT) is used, it may be indicated by this parameter. |
| DIV_DSN_PREFIX | Sets the default value for the VSAM Linear files dynamically allocated by the system to back its data-in-virtual data spaces. One or more high level qualifiers for the VSAM Linear clusters may be defined. Any value may be specified, but the total length of the prefix cannot exceed 26 characters. The final data set name is determined by appending the IMS ID and an internally generated qualifier (Fxxxxxxx) to this value to make each data set unique. |
| DIV-SIZE | Sets the default value for this size (in kilobytes) for the VSAM Linear files allocated by the system to back its data-in-virtual spaces. Note that these data-in-virtual spaces are used to house the IMS database updates made to the online data bases while system online reorganizations are running. By using VSAM Linear files to back the system data spaces, the system protects the OS/390 page data sets and paging subsystem from being impacted by the online reorganizations. This parameter determines the size of each VSAM Linear data set allocated by the system, and consequently determines the size of each system data space. This value may be tuned as the system runs so that it allocates as few data spaces as possible during reorganizations. One data space is the optimum number in terms of performance, so setting this value large enough to house all database updates made during a reorganization is suggested. |
| DIV_SMS_DCLASS | Sets the default value for the VSAM Linear SMS DATACLAS value. It can be any valid, defined SMS DATACLAS and is used to determine the SMS DATACLAS value to be used on the allocation request. If this parameter is not specified, DIV_UNIT, DIV_SMS_SCLASS, or DIV_SMS_MCLASS may be specified. |
| DIV_SMS_SCLASS | Sets the default value for the VSAM Linear SMS STORCLAS value. It can be any valid, defined SMS STORCLAS and is used to determine the SMS STORCLAS to be used on the allocated request. If this parameter is not specified, DIV_UNIT, DIV_SMS_DCLASS, or DIV_SMS_MCLASS may be specified. |
| DIV_SMS_MCLASS | Sets the default value for the VSAM Linear SMS MGMTCLAS value. It can be any valid defined SMS MGMTCLAS and is used to determine the SMS MGMTCLAS to be used on the allocation request. If this parameter is not specified, DIV_UNIT, DIV_SMS_DCLASS, or DIV_SMS_SCLASS may be specified. |
| DIV_OTHER | Sets other parameters to be used on the IDCAMS command to create new VSAM linear data sets. |
| HPO_SYSPRINT | Identifies the SYSOUT class to be used in dynamically allocating the SYSPRINT DD. This DD is required when invoking IDCAMS. |

System Initialization

The initialization in Step S1 of FIG. 3 includes several operations outlined in further detail in FIG. 4. Setup of the recovery environment in Step S101 and verification of authorization in Step S102 are performed. The process verifies presence of the system started task, i.e. subsystem entry in Step S103 and validates the system input parameters in Step S104. The presence of the required IMS subsystem and the system AOI/CI code therein are verified in Step S105. This is accomplished by establishing communication between the batch reorganization job and the AOI BMP begun by the specified system module DFSAOE00 hooked in place by DFSPPUE0. The specified module beginning the AOI BMP has two tasks: to wait for an ECB anchored off the subsystem entry; and to wait on AOIWAIT for the module exit to pass the contents of specified files, e.g. /DISPLAY DB DBD(dbdname), /DBR DB DBD(dbdname), and /STA DB DBD(dbdname). Verifying that the system is active can be accomplished by using address space identification (ASID) information in the control block anchored off the SSCT to verify that it matches the executing job. Then a post of the ECB that a module such as HPOAOPGM is waiting on and a WAIT on the system ECB may verify that the code is still alive and well. HPOAOPGM is the module that issues commands and interprets results, and communicates between the system and the specified module DFSAOE00. In this case the DFSAOE00 module may receive the output of commands and send the output to HPOAOPGM, and communicates between the system and HPOAOPGM. A heartbeat is established in Step S106 between the system and IMS AOI/CI code. The heartbeat is having the system post a status in the ECB for HPOAOPGM and then wait on another ECB in the control block. HPOAOPGM posts the ECB for the system. The specified module DFSAOE00 may set a flag that the status of the system post has been received. In this way the system knows the communication link is there. The database description (DBD) is verified against the active DMB in IMS in Step S107. WTOR function monitoring is activated if desirable to ensure all BMPs using the database are stopped in Step S108. WTOR suspends execution until an operator replies to a displayed message. The process communicates to the operator to stop all BMPs using the database being reorganized. The process then issues initial DBRC commands in Step S109, ensuring that CI/LOGEXIT are activated. The initial DBRC commands would be to list the allocation (ALLOC) records for the DBD that is to be reorganized. It is preferable to see who is using the database. A command (e.g. /DBR with FEOV) is issued to switch logs and set up for CI to capture updates. Another command (e.g. /DIS DB) is issued to verify the database is offline. Another command is issued (e.g. /STA) and a message is issued informing the operator they may resume BMPs but they may be stopped again soon. Information is acquired in Step S110 on existing database data sets from DBRC and concurrent image copy (CIC) database data sets are allocated. A command such as LIST.DB DBD (dbdname) DBDS may be issued to get a list of all database data sets. In this way the process determines exactly what information is desired about the databases so it can determine where to get the information.

In Step S2 of FIG. 3, the existing database is unloaded and then directly reloaded to a shadow database. In Step S3, a CIC is taken. In Step S4, the database is analyzed during the image copy process.

Produce Concurrent Image Copy (CIC)

The CIC is updated to reflect the bitmap of the database. This is preferred because the bitmap is at the beginning of the database and may have been updated since it was originally copied. An IC of the reloaded database is required so each data block may be written to both the database and the IC data set. The CIC acts as a source of data for unloading, and a backup in case unloading goes wrong.

The recommended method of creating the CIC is from the previous IC and adding the IMS logs. Alternatively, an online fuzzy copy from a batch read BMP and adding the IMS logs can be performed, although this may take a relatively longer time. Copying an online read-only mode DB utilizes the simplest logic, but the DB is unavailable for update.

The CIC may be created in parallel with unload, or may be completed before the unload begins. If unloading from the IC, then clearly CIC may be created before Unload starts. Either offline batch or online copy can be used, but a /DBR may be desired to sync an offline batch IC with the live DB. If using the above-described BMP approach, the CIC can be created in batch after the Unload starts.

Note that there are a few differences between unloading from an IC or performing a BMP unload. Here "BMP" means reading the live DB while it is being concurrently updated. It is assumed that a BMP may be used, but any technique that reads the DB, while placing the desirable locks on root segments, could be used. To run off an IC, the CIC may have been created before Unload can start. Using a BMP, the (backup) CIC can be created in batch in parallel with Unload. A BMP may place locks on the roots. With a BMP, the CI may have access to the ROOTSEQ of the record that is currently being unloaded. This ROOTSEQ value may be used to decide if the intercepted call may be applied or may be ignored. Apart from the above, there is no change in the main processing.

The preferred process for producing a CIC is outlined in FIG. 5. The process checks for the presence of a module such as DBOCTRL in Step S121. If the module is absent, it builds suitable input parameters and dynamically allocates them. Linking to IDIDBO is accomplished in Step S122. The process deallocates the module DBOCTRL in Step S123 and checks the return code from IDIDBO in Step S124. The process then issues secondary DBRC commands if desirable in Step S125. At this point there is a fuzzy IC that may be converted to a clean (batch) IC. A command (e.g. /DBR with FEOV) is issued to switch logs. A module such as GENJCL.CA (with special member) is run to have DBRC pull the correct logs. The list can be filtered to the time frame required, that is the logs created since the last /DBR. CA is run with the fuzzy IC and logs to create a CA file. High Performance Routing (HPR) is run to apply the CA file to the fuzzy IC. The IC is then registered as a clean (batch) IC in DBRC. The process then notifies the user that BMPs operating against the database may be restarted. It may be noted that the IDIDBO code for a CIC may already have DBRC logic that may record the CIC, so secondary DBRC commands may not have to be issued. The process next invokes an IMS change accumulation to finalize the CIC in Step S126. This produces a clean recovery point. This also updates the Recovery Control (RECON) data sets, which store information about logging activity and events that might affect the recovery of databases. It may be noted that unless the logs are switched prior to the change accumulation, a clean recovery point may not be created. Registration of TYPE=BATCH DBRC occurs in Step S127, whereby a clean IC record is placed in DBRC. When CIC is finalized and ready to be brought online, the indicator in the subsystem control block for this IMSID is set to start recording updates and capturing log records.

The above IC logic can be run iteratively any number of times, creating ICs as of times $T_1$, $T_2$, . . . $T_n$. Change accumulations can also be run iteratively any number of times before being applied to an IC, creating CAs as of $T_{n1}$, $T_{n2}$ etc. All of these iterations are offline processes that can be performed on any CPU, once the log records are available. In theory CA could run off the live log data set, but the performance impact of extra arm contention would not make this practical.

Thus there is no reason for an installation not to have a batch created IC as of a few days ago of all its DBs, plus change accumulations as of yesterday. All of this can be done without any load on the live IMS CPU. If planning to reorganize a DB, an IC as of a few hours ago can easily be created, and all log records up to a few minutes ago change accumulated. A pre-reorganization IC (CIC) can then be created very rapidly.

In summary, to create an IC as of (sync time) $T_{n+1}$ there are two techniques giving necessarily identical results. Offline technique starts from $IC_n$ and applies all IMS log updates from $T_n$ to $T_{n+1}$. Using live DB, start fuzzy copy at $T_x$, end copy at $T_y$, and apply all IMS log updates from $T_x$ to $T_{n+1}$ where $T_{n+1} > T_y$.

Unload of Concurrent Image Copy (CIC) Database

The process then unloads the CIC database as shown in FIG. 6 to the file F_UNLOAD. A small utility may be included that converts the F_UNLOAD data set into HD unload format, thereby allowing a user access to this data set. The process builds suitable DBOCTRL input parameters, specifies the unloading function (e.g. FUNCTION=UNLOAD), and dynamically allocates the input parameters in Step S131. Linking to IDIDBO is accomplished in Step S132. DBOCTRL is deallocated in Step S133. The return code from IDIDBO is checked in Step S134. It may be noted there is no DBRC work (i.e. DBRC=N) in the unloading process.

Unloading in the preferred embodiment occurs during a concurrent update, yielding the best overall performance. A standard BMP may be performed, whereby a GN is done on every segment. If the overhead is unacceptable, a modified BMP with DBO may be utilized. A GN qualified on root name to access all roots and place a read lock on record N is performed. This safeguards against any future attempts to change N until its unload is complete. Upon getting root N, a check is made to see if its RBA is in the Call Interface Stack. If yes, an uncommitted update may exist. The process waits until Call Interface clears the record from its stack. The system, which already had stopped new users, may now have a known valid record to itself for processing. Some changes to DBO to implement the foregoing include having the BMP supply CIs, rather than have DBO perform its own I/O. When DBO reaches the next root, BMP may know and issue GN to place lock. The output of XREF file giving RBA_old may go to PCBKEY.

Alternatively, the unload may be performed using a Read Only on the database. The DB on DASD is frozen from initial /DBR until reload completed, and a batch unload (e.g. via DBO) performed with no locking or CIs. While this method employs the simplest logic, the downside is the DB is unavailable for update during the entire process. Unload from IC is another alternative. The IC may be a DASD resident. A batch read of the IC creates a fuzzy unload file. A batch apply of F_CALLI creates an unload at the time of the final /DBR. CIs run from time of IC start to the time of the final /DBR, and all CIs are applied. No locking is needed by the data reader. This method employs the second simplest logic, but requires two job steps.

When Unload creates the F_UNLOAD file, it is missing some updates that occurred while it was being unloaded. These logical updates, against the old DB, are captured by the CI, which intercepts all DL/I calls from all regions performing updates while the Unload is running. The CI selects out calls against the DB being unloaded. These calls however indicate "intents", and the sequence of capture does not necessarily equal the sequence in which IMS performs any resulting DB updates. A Log Exit also captures Commit and Abort records. These enable actual updates to be identified. They also enable correct time sequence to be found. The merged CI and Log Exit records are passed to an Apply module, which performs equivalent logical updates against the DB created by the F_UNLOAD file. The result is a reloaded DB with all updates.

Figure 7:
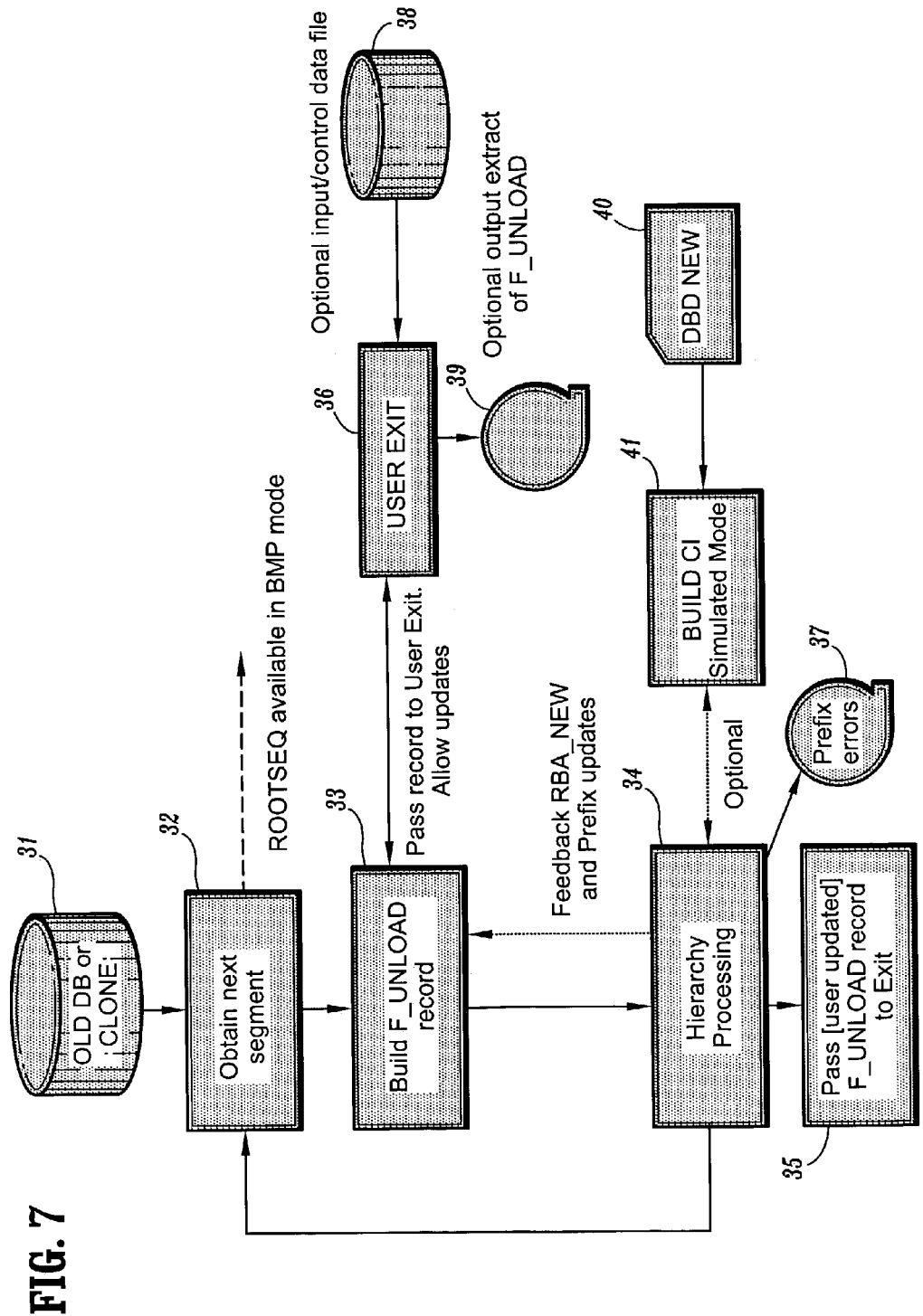
FIG. 7 shows a system according to one embodiment of the present disclosure for use in unloading the concurrent image copy database.

FIG. 7 shows an unloading system 30 according to one embodiment of the present disclosure for use in unloading the concurrent image copy database. A data reader 32 obtains the next DB segment from the old (disorganized) DB or clone 31. Unload can be run in different environments, Batch, BMP, use of DBO, accessing the live DB or an IC. In BMP mode, ROOTSEQ is available. The segments obtained are used by another software-implemented module 33 to build the F_UNLOAD record. The record is passed to User Exit 36 to allow updates and to a hierarchy processor 34. The user exit 36 optionally receives data from an input/control data file 38 and provides F_UNLOAD to an optional output extract 39. Hierarchy processor 34 places the records in hierarchical order, feeds back a new RBA (RBA_NEW) and prefix updates, and passes the user updated F_UNLOAD record to a prefix error output 37 (if desirable) and to Exit 35. Optionally, a simulator module 41 builds a control interval in Simulated Mode from the new DBD 40 and hierarchy processor 34.

Segments may be obtained in IMS unqualified GN sequence, by following actual IMS pointers. Segments may be obtained in SEGMSEQ. In addition to the data that a regular IMS GN call would return (PCBKEY and DATA), it may be necessary to obtain RBA and PREFIX The low level manner of reading segments may not be defined by the architecture. Possible techniques are as follows: Issue modified GN calls (modified to obtain RBA and PREFIX, and probably also modified for speed) against a DB, this may be the live DB (in a BMP environment) or an IC (in batch); make use of an existing product (e.g. DBO) to read an IC.

If using a BMP to access a live DB, a read lock may exist on the root of the record being unloaded. Such a lock prevents any access to any segment in that record. (Except for programs using PROCOPT=GO.) If using a straight BMP with DL/I calls, the lock may automatically be placed there. If another technique is used (e.g. user control block decoding) then the lock may be placed there by other means, maybe all roots are accessed via a DL/I call. The value of the currently locked ROOTSEQ may be available for reading by the Call Intercept.

This standard output goes to file F_UNLOAD. Records from this file may be passed internally to the RELOAD MODULE. Depending on other requirements some or all of the records, or parts of records, may be written to an external file or used to build in core tables. The basic output data may be Flags, Segment Data, Segment Prefix, Segment RBA, Segment PCBKEY. If using any form of standard IMS GN the PCBKEY may be automatically be provided. In general, it may only be required, by later reorganization steps, for roots and Index Source Segments. If segments are compressed, they may need at least partial decompression to obtain. If using a high-speed technique (i.e. not standard DL/I calls), then decompression may not be forced at read. Thus for compressed non-root or source segments (identified from DBD) the system may be expected to provide an option not to decompress to find that key.

After an F_UNLOAD record has been built, it may be passed to a user exit. One approach is to allow the exit to modify the record in any way; it is also able to return a code specifying that the record is to be skipped. The most common use of an exit may be to write extracts to an optional user file, a method to establish a DCB should be provided.

An F_UNLOAD record may be passed to another exit for hierarchy processing, before and/or after being passed to the user exit. Unlike the user exit, this may be system-provided code. It may not modify the record, but may create extra output files or tables. Activities include the following: 1. accumulating a hash of the user data. at unload, this may be combined with a hash from update, apply, to give a result that can be compared to the contents of the old DB after its final /DBR. 2. Full pointer checking, including SEQ fields against PT chain. 3. Simulated CI build.

An F_UNLOAD record may now be available and may be passed to the exit module. This module may, as required, perform any combination of the following: 1. Pass record to RELOAD module for immediate loading. 2. Create a table. XREF table RBA_old<->PCBKEY (for index segments). 3. Create an extract file. 4. Write all records to a file. This file would be a fuzzy logical copy of the data, neatly decoded. It may be combined offline with F_CALLI to provide a full decoded logical image copy, which may have many processing uses. The raw file may also be used for a fast restart.

Initial Reload of Reorganized Database

The initial reload of the reorganized database from the file F_UNLOAD into DBO is shown in FIG. 8. There is no DBRC work here (i.e. DBRC=N). The process builds suitable DBOCTRL input parameters, specifying the reload function (e.g. FUNCTION=RELOAD), and requests a detail report (e.g. DETAILREPORT=YES), and dynamically allocates the input parameters in Step S141. The process then allocates new database data sets in Step S142. An index building function such as HPOSIB (explained below in Step S5) is run in Step S143 and the result attached to every secondary index. Linking to IDIDBO is accomplished in Step S144. When a new root segment is read in Step S145 the previous root may be made available to each instance of HPOISB to allow secondary index creation (Step S5) to be done in parallel with the reload. The image copy of Step S3 is performed in Step S146. DBOCTRL is deallocated in Step S147. The return code from IDIDBO is checked in Step S148.

In all HPR situations where ICs are created, the physical sequence of creation is unimportant. Practical considerations imply that unless the byte string is a DASD resident, then updates are probably applied in ascending RBA sequence, but this is an implementation rather than a logical requirement.

CIC creation at Load is a logically different situation. A totally new byte string is created at load, and some internal IMS logic now makes the RBA sequence of creation important. Having a required sequence can cause a problem if the byte string is being written to tape.

RBA sequence at load may have various components, including knowing the RBA to use. In IBM and BMC utilities RBA=Function(IMS data, CIsizes, Buffer_pool_contents). For this system, RBA=Function(IMS data, CIsizes). The difference means that a system load is repeatable, and if a reorganization is being done new RBAs are available at unload time for creation of indexes. Also multiple virtual loads could be simulated during unload to select optimal DBD parameters for the real re-load. Some data may be directed out of the current CI, e.g. to HDAM or DEDB overflow areas. HDAM and DEDBs can have data loaded in random RBA order. Bit map blocks may be updated out of physical sequence.

This may involve knowing RBAs earlier than actually required by the physical writing of the byte strings and thus introduces no new problem. One option is a DASD work file to store segments till their final RBA location is being processed. Another option (which should not happen) is before initial load the data should be sorted into randomizer sequence. Numerous techniques exist to accomplish this. At reorganization reload no sort should be needed if using DFSHDC40, or its fast path derivatives, as then randomizer seq=X* internal_hash_value. The hash value is independent of any DBD information, and X is simply the number of available RAPs, computable from the DBD. Multiplication should not change physical sequence (it does change GN sequence, but not in a way that impacts the load logic.) However, if load file is not in randomizer sequence a parallel tape IC cannot be written.

Yet another option makes it necessary to look at bit map blocks. IMS, which pre-dates VSAM uses the term "bit map blocks" for certain blocks whether they are CIs or blocks. This section inter-mixes the terms "block" and "CI" to stay consistent with both conventions.

When a program wishes to add a segment to an IMS DB, then IMS may find a location to hold the segment. The IMS manuals explain the exact space search algorithm in detail, an abbreviated description follows in order to explain the bit map block situation. IMS may search CIs for space in a clearly defined order. The further down the search chain it has to go, the less "desirable" is the final location. Each CI has a Free Space Element (FSE) chain. It is this chain that IMS should use to finally select a location. The segment should go in first searched CI that has sufficient room. If there are several possible locations within the CI, then the smallest useable one should be used. That final decision may not be the best logic, but that is how IMS works. IMS could thus just search FSEs in each CI in "desirable CI" order. However this could involve many wasted searches if free space is difficult to find. Thus IMS maintains Bit Map Blocks to try and make the search more efficient. It is important to note that Bit Maps are only attempting to improve performance, it is the actual FSE data that determines where IMS should place data. Having a bad Bit Map Block may impact performance but should not cause "real" DB errors.

If (usable) CIsize=N, then Bit Map Blocks contain 8*N bits. The first data CI in an HD or DEDB is a Bit Map Block. Its bits indicate the available space in the following 8*N CIs. After every 8*N CIs another Bit Map Block is inserted. These Bit Map Blocks are like any other CI, except that their FSE chain shows no free space. At load, HIDAM steps over them, HDAM and DEDBs may have them selected by their randomizers, in which case those records are immediately "non home". (DFSHDC40 and its DEDB derivatives avoid the first Bit Map Block, but not others.)

Bit Map Blocks come before the CIs they map. This is because of MVS data set extensions; any other location would be difficult to implement given that neither primary nor secondary space allocations would in general be a multiple of 1+CIsize*8.

The Bit Map Block simply states whether a CI has space for the largest segment type assigned to that data set. If a data set contains a segment type that is far larger than any other, then the bits are fairly useless, as IMS may not search CIs that do have the required space. There is even a utility to set bit maps according to user specified space, e.g. if users know that the largest segment is never, or very rarely inserted, then users may request settings record space for the largest likely insert. This utility proves that IMS does not mind finding a "bad" bit map. It may "correct" a bad bit for future use, so the utility only buys one insert per CI. It is possible that a newer utility changes the field "largest segment size" in the DMB. If a bit incorrectly claims a CI does not have room for the largest segment, then there should be a performance impact as IMS might eventually use a less desirable CI. For the reverse, the error might impact performance, but sometimes the impact may be positive, i.e. while there is not room for the largest segment, there is room for the required insert.

During updates the Bit Map CI may be updated via log records, just like any other CI. Thus they have no special consideration as far as HPR is concerned. At load data may be written into an empty data set in CI sequence. Thus the basic flow is to write bit map CI with default saying all its following 8*N CIs have space. While loading following CIs, maintain an image CI in storage. If any bit needs changing, then go back and update the bit map block. For a byte string on DASD (live DB, duplicate DB or IC on DASD) there is no problem. However for ICs being written in parallel to tape, the last step may be a problem.

The implication, of needing to update the Bit Map Block, is that a newly loaded CI(s) is so full that the very first insert to it might cause a chained insert to the end of the data set. This would be undesirable after initial load or reorganization. The situation may arise due to a number of factors.

An HIDAM user error where the Distributed Free Space option was not used correctly may occur. If some rare excessive size segment is the problem (so large that one does not wish to leave that much free space in every CI) then may claim the IC is "superior" to the DB, effectively applying the bit map utility mention earlier. An HDAM or DEDB user error may occur. By selecting the correct combination of expected synonym count and packing density the percentage of such CIs at load can be set to any desired figure (at least it can if using DFSHDC40 or its DEDB derivatives as output is pure Poisson.) In this case the percentage of error bits should be so low as to have no performance impact—in fact it may be positive, for note the only error possible is to incorrectly state that the CI has room for the largest segment. If a user claims percentage is too great, then the wrong combination of synonyms and packing density may have been set.

Even if the bit map blocks on an IC are "wrong" and could have negative performance implications, they should only be used if the IC is used as an updatable DB. This implies the rare case when it is used for DB recovery. The expected impact is thus very low. A hot standby can still be maintained using this IC, its bit maps may become "less wrong", but again there is not a logical problem.

A pointer checker program that also checked bit maps would flag IC as being in error. It should however be obvious that no real problem existed. A security hash check would flag a security violation, if bit map blocks were not excluded from the hash.

The fact that bit map blocks in a tape IC, created in parallel to load, may not be "correct" is therefore not necessarily a point of concern. Each individual DB should be evaluated to determine any likely performance impact. If there are errors after a HIDAM load, the real concern should be why some CIs are full immediately after the load. For HDAM the percentage of incorrect bits should be too small to be of concern, else one needs to examine the DBD parameters to see why the expected synonym size and packing density are out of step. A randomizer smoothing feature could remove the small percentage of totally full CIs from a well designed HDAM or DEDB. Then there may not be a need to update bit map blocks at load time.

Build Shadow Database Indexes

In Step S5 of FIG. 3, all shadow indexes are built using an index building function such as HPOISB as shown in FIG. 9. The function picks up initialization parameters and confirms ready status in Step S151. The function waits for a record from the database in Step S152. Once it arrives, the record is passed to index build in Step S153. This continues until an End Of File (EOF) is signaled in Step S154. The index is finalized in Step S155. The function then sets the return code in Step S156 and exits in Step S157.

Apply Interim Updates

In Step S6 of FIG. 3, all updates are captured. In Step S7 as many of the updates as possible are applied to the shadow database as shown in FIG. 10. There is no DBRC work here (i.e. DBRC=N). The process ensures that each index build function has completed in Step S161 and detaches task(s) in Step S162. The process links to a module such as DFS-RRC00, asking it to invoke a function such as HPOISR1 with a PSB specified by the user in Step S163. The process then checks the return code from DSFRRC00 in Step S164. The HPOISR1 function reads the file F_CALLI containing the captured updates, passing each call in turn to native DL/I, the IMS data manipulation language that is a common high-level interface between a user application and IMS. Note that depending on how F_CALLI is written this processing may be different. Updates may be stacked until a commit or rollback is read and only then would the whole command sequence be passed to DL/I. In this mode, if a commit or rollback was not seen, the stack would be discarded. The process then remembers the last update done for HPOISR2, which reads F_CALLI from the point of the last update, established by HPOISR1, passing each call in turn to native DL/I. The process sets a return code for the HPOISR1 function and then exits. At update apply time, the F_CALLI repository may match ROLS calls for a recovery token with the updates to be discarded by the SETS table that is recorded with each update call.

Figure 11:
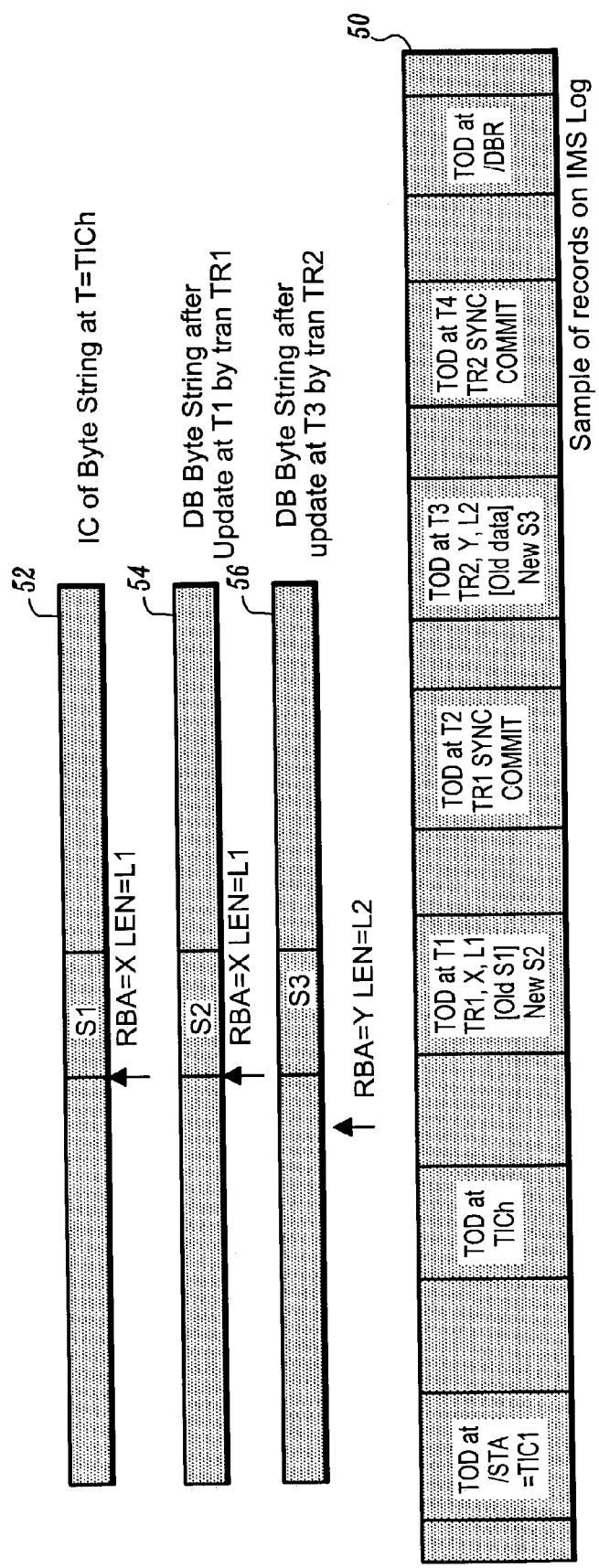
FIG. 11 shows updating of a database according to one embodiment of the present disclosure.

FIG. 11 shows updating of a database according to one embodiment of the present disclosure. A sample of records 50 on the IMS log are updated in byte strings 52–56. The byte strings 52–56 are the concatenation, as seen by IMS applications, of buffer pool in front of DASD. Due to locks no updates are visible to applications until a corresponding SYNC record is physically on the log. The log shown may span multiple volumes, and could also be a log extract data set showing only records relating to the DB. In timing sequencing all times used equal some time on an existing log syn record for the DB. A randomly chosen time may be rounded down to previous sync record time. This is because on an IMS DB changes can only happen at sync times, so referring to other instants is meaningless. /STA and /DBA are considered sync times. Time of CIC (after initial load or reorganization) is defined as time of first /STA of DB after reload.

As the Apply uses DL/I calls, the "fuzzy" unload may be an internally consistent IMS DB, and that applying the updates may give the correct result. Central to the success of the CI/Apply logic is the concept of two completely independent areas in a DB at any instant: the area visible to Unload, and the area visible to concurrent update programs. The area visible to Unload includes the record N being unloaded, and records N−1 and N+1. The area visible to other programs includes all records except the locked N−1, N, N+1.

As there are no logical relationships there may be no pointers into or out of either of these two areas. Thus no operation on one can raise a pointer issue in the other. A visual picture is that, with the proposed locking, the record being unloaded is a set of objects surrounded by a blank wall. Outside the wall concurrent updates are changing other objects, but Unload cannot see any of that activity. Likewise concurrent updates cannot see what Unload is doing. Locks on N−1 and N+1 are what make the wall blank. If they did not explicitly exist there might be windows through which activity could be viewed.

Apply Updates

Not all update calls for the DB, intercepted by Call Intercept, may later be applied by Apply. The F_CALLI file passed to Apply may only contain records that should be applied. The dropping criteria are described in the section on the Call Intercept module. Many of the captured calls may have been against PCBs which did not give full update authority, which is covered by status code filtering, or did not show every segment, which would impact positioning, e.g. the sequence GHN, DLET. This may require that Apply use the full PCBKEY that was used in original update. Many of the captured calls may have been against PCBs which used a secondary index, which can give inverted views of structures and change the GN sequence. Again this requires that Apply use the full PCBKEY used in original update. Many of the captured calls may have been against PCBs which used Field Level Sensitivity, which requires intercepting the data after it went through mapping.

In order to overcome problems listed above, and allow use of a single PCB, the following logic is proposed: 1. Before issuing the call that performs a DLET or REPL establish position via a single GHU call. 2. Before a non fully SSA qualified ISRT call, establish parent position via a single GU call. The above may be done regardless of how position was established in live application call.

The actual IMS call (this is everything needed to re-issue the call to IMS) is available in captured record. The comparison of update key U and unload key R ensures that only updates that must be applied are passed on to the Apply process. Thus the apply process in receiving an update for a segment knows without any checks that the update must be applied, and exactly what IMS call could be issued to do this.

Thus the proposed sequence is: reload record R, and later apply any changes to R by issuing DL/I calls, or their fast equivalent. No assumption is made above about when R is reloaded or when updates are applied. A BMC approach of reloading may be used, followed by apply all, or Apply could be performed as soon as the call is intercepted and COMMIT confirmed. If HIDAM or HISAM index is used, up to R must exist at time of applying update. To obtain repeatable load (no IC needed after reload), for inserts the space search algorithm must be controlled in Parallel Apply of Concurrent Updates (PACU). This should not be a problem in a batch program doing reload. Parallel HDAM/DEDB root inserts could pose a performance problem in PACU. Applying changes from concurrent updates seems very easy if Call Intercept is used. Parallel apply with reload, rather than wait for reload to complete could probably be done.

PACU using for example P_RELOAD is possible using F_CALLI and the system architecture to allow updates to be applied in parallel. The unload elapsed time is mainly I/O and includes GN sequence unload which is a semi-random CI sequence, and concurrent access adding lock and DASD contention to unload. The concurrent access includes reads (but these do not go to Apply), concurrent updates of records not yet unloaded (approximately 50% of concurrent updates do not result in Applies, and using CI they do not even reach Apply), and concurrent updates of records already unloaded (these 50% will need Apply). Reload elapsed time is mainly I/O and includes reload in CI sequence (allowing chaining of a set of CIs), primary index building (but this should be in parallel on another DASD), and applying 50% of concurrent updates.

CI will allow immediate (as soon as update confirmed by a log record) PACU, thus saving elapsed time as described above. There is no increase in reload, after reload complete almost all updates already applied. With Log Exit it might not be possible to use PACU. In addition it may be necessary to perform sorts of unload file, and possibly log exit file, after reload and before Apply can start.

Finalize Process

Figure 12:
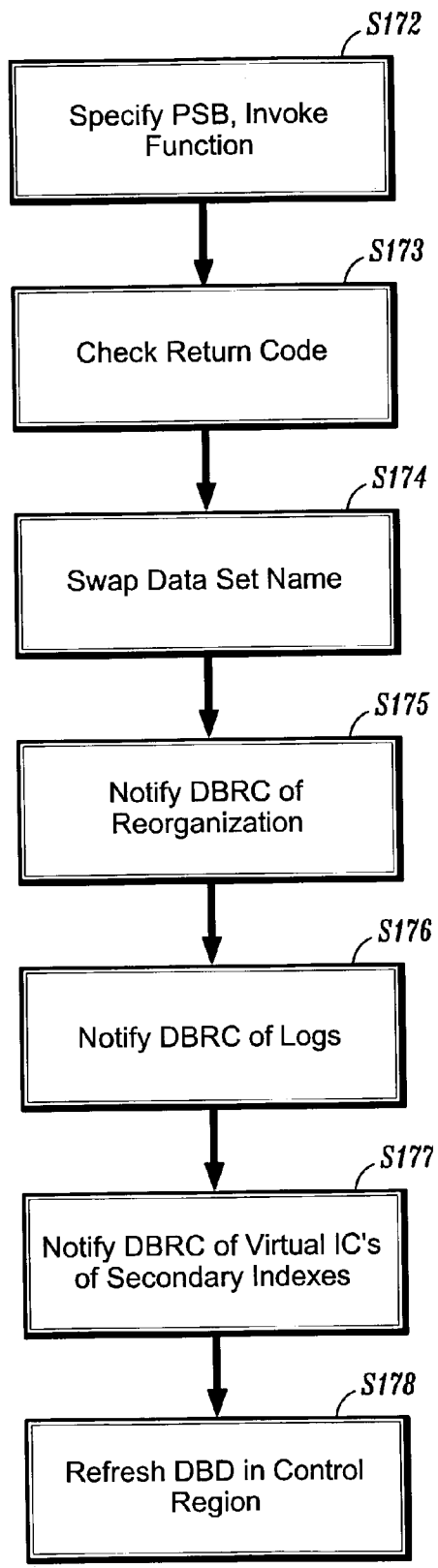
FIG. 12 is a flow chart of a method according to one embodiment of the present disclosure for finalizing the reorganization process.

In Step S8 of FIG. 3, the old database is taken offline. In Step S9, the shadow database is finalized with any remaining updates as shown in FIG. 12. The process links to DFS-RRC00, asking it to invoke a function such as HPOISR1 with a PSB specified by the user in Step S172. This may apply the final batch of interim updates. The process then checks the return code from DSFRRC00 in Step S173. Data set name swapping occurs in Step S174. The process notifies DBRC of the reorganization in Step S175 and notifies it of logs created during the application of most interim updates and the final batch of updates in Step S176. The DBRC is notified of virtual ICs of secondary indexes in Step S177. The DBD in the control region is refreshed (if desirable) in Step S177.

Create Incremental Image Copy (IIC)

In Step S10 of FIG. 3, the final IC is created. At the user's discretion, the final image copy may be created after the new database is placed online, to even further reduce offline time. The intermediate IC, or CIC created in Step S3 is updated to reflect the bitmap of the hard drive (HD) database. The Incremental Image Copy (IIC) is created using the intermediate IC and log data sets created during Step S7 and Step S9. The DBRC is then notified of the IIC. The system does not inform DBRC of activity involving secondary indexes or HIDAM primary indexes. The indexes may be rebuilt using Secondary Index Builder (SIB) once the main database is recovered. In the event that this processing fails for any reason, the database may be stopped manually and any associated indexes, the requisite ICs may be created, and the database restarted. If this is not done, there may be no backout point if the database is subsequently corrupted.

Safetynet Feature

In Step S11 of FIG. 3, if SAFETYNET=YES is set, both the old database and the shadow database are unloaded and the two are logically compared as part of the "safetynet" feature. If the results do not match, the reorganization may be aborted and the old database returned to IMS. If the results match, the reorganized database is made available to IMS. Step S11 is user selectable so that this process can be performed at a user's discretion. It may be noted that the safetynet function is performed while the database is offline to IMS and adds to the amount of time that the database is unavailable to IMS.

Integrity Checking

The reorganized DB can be live data. This section is concerned with potential errors that the system might make, that may not necessarily be caught by a pointer checker algorithm, e.g. completely lose an Apply change, or corrupt user data. At (sync. time) T3 the old DB is finally stopped and the new DB started for the first time. The old DB has been updated by IMS through time T3. The old DB has not been directly modified by the system, and is thus to be considered the official version of the customer DB. The contents of this DB may be slightly different to what they would have been had the system unload not been run in parallel. This is just an alternate valid set of customer data.

For the reorganization to be considered error free, then if the old DB were also started, on a separate machine, then any possible set of single threaded IMS DB calls run against each DB, should provide identical results, as seen by user application programs. It is inefficient to try every possible set of calls, so a lesser set of calls are used that seem to logically ensure that if they produce equal results, then all calls would.

A check during system testing may be to run Unload against both DBs as of time T3.

The test would be that each produce that same number of F_UNLOAD records that each record in sequences equal on: Segment name, PCBKEY, and User data.

In order to check the reorganization was successful, one could perform the same check test as above, but this would take a lot of time, which could be significant as the entire test runs in the DB unavailable (wall clock) time of T3. A faster technique using hashing is proposed.

At a minimum, for each segment (assume some unique ID x), the following string $S_x$=SEGNAME$_x$‖PCBKEY$_x$‖DATA$_x$ is hashed to form a value $H_x$ where $H_x$=hash($S_x$). Later the system may need to add selected bits from the segment delete flag to the hash e.g. the physical and logical delete bits. For IMS use, one may modify the hash algorithm within HDAM randomiser DFSHDC40 to create a 128 bit hash and the system can generate a 128 hash for every segment.

As Unload reads each segment it creates $H_x$ and also builds a cumulative hash B=B XR $H_x$ Where B starts as all hex 0, and XR is the Exclusive Or operation. The Unload program may have an option to just create the cumulative hash, without creating the full F_UNLOAD records.

There are two cumulative hashes from running Unload. 1. $B_{FUZZY}$: Hash of at end of unload at time T2. 2. $B_{OLD}$: Hash after running Unload in hash only mode, against the old DB after its final /DBR.

Apply starts with B=$B_{FUZZY}$, and then computes B=XR $H_y$. Where an Hy value is computed for every: 1. DLET:

Requires data from GHU; 2. ISRT; 3. REPL Old value. Requires data from GHU; 4. REPL New value.

Because any string Exclusive Ored to itself creates all hex 0, the above process correctly updates the cumulative hash. The final cumulative hash from Apply is $H_{NEW}$. If the reorganization worked correctly $H_{NEW}=H_{OLD}$.

The physical and logical delete bits may not be part of the string Sy. Later Apply hash logic may be modified to take these into account.

One option may be not to issue the /STA for the new DB until the hash check is complete. However, to be a fully valid test, the computation of $B_{OLD}$ cannot start until after the /DBR for the old DB. Thus while scanning the entire DB to build $H_{OLD}$ the DB is unavailable. If the error were discovered after any updates were made to the new DB, there may be no recovery: the new DB, and its IC, are invalid; or the IMS log records of changes cannot be applied to the old DB, as physical structure is different.

For safety a method exists whereby all updates against new DB, from time T3 till time of error discovery, can be replayed against the (valid) old DB. It is possible that the customer already has a transaction replay facility that can be used, e.g. banks have been known to run a whole nights work using the wrong interest or currency conversion tables, and have a re-run process in place.

Call Intercept and Apply may replay updates made to the old DB, against the new. Before the /STA new, the Call Interface is turned on against it, just as it was against the old. Then if an error is found, the old DB is restarted all the updates made against the new DB are replayed against it. This may resolve some situations, but still may not cover: 1. the online transaction problem, mentioned in previous section; 2. a case where error has caused a bad return, leading to an invalid set of subsequent calls; 3. a logic error in the Call Intercept or Apply logic, which may be activated both times.

Start Reorganized Database

In Step S12 of FIG. 3, the new (reorganized) database is placed online in IMS. The module HPOAOPGM is notified that the reorganization is complete, allowing it to go into dormant mode.

F_UNLOAD File

The UNLOAD module creates the F_UNLOAD file shown in Table 4. The sequence of records may be determined as follows. UNLOAD creates the file in GN sequence, and time of day (TOD) stamps are added. RELOAD reads this files and, as default, writes the records sequentially across the RBAs in new DB. That means that the following are ascending as the file is read: TOD by random increment; GN_SEGSEQ by increments of 1; ROOTSEQ by random increment; and RBA_NEW by random increment.

TABLE 4

F_UNLOAD file contents.

| Field | Short description | Format |
|---|---|---|
| LLbb | Standard MVS start of variable length record. | H, H |
| TOD | An STCK taken while read lock existed on root. | 8 Binary |
| GN_SEGSEQ | Absolute segment number in DB | 4 Fullword |
| FLAGS | Show choice of options. See fields marked (FLAGS) below. | 2 Bit flags |
| RBA_OLD | Start of prefix in disorganized DB | 4 Addr |

TABLE 4-continued

F_UNLOAD file contents.

| Field | Short description | Format |
|---|---|---|
| RBA_NEW | Start of prefix in reorganized DB. Optional (FLAGS). | 4 Addr |
| SEGSIZE | IMS segment size. PREFIX + DATA. Computed at UNLOAD using data read plus DBD information. | Halfword |
| OFFSETS | To all fields following variable length PCBKEY | Halfwords |
| PCBKEY | PCB key feedback. Required in root and index source segments. Should be provided for all segments. (FLAGS). May be optional for compressed segments. | Var char |
| SEGCODE | PREFIX byte 1. Used with DBD to decode prefix and data. | 1 byte |
| DELFLAG | PREFIX byte 2. Includes split segment flag. | 1 byte |
| POINTERS | PREFIX remaining bytes. Old RBA pointers. May have additional data pointer (DELFLAG split bit) | Set of RBAs |
| PSEUDO DATA | Pointers as RS values. Optional (FLAGS) User data. May be compressed (FLAGS) May be missing LP key (FLAGS) | Set of RSs Var char |

ROOTSEQ is not explicitly in the records but is derivable from root PCBKEY and DBD. This is the value that is passed to CI for filtering out updates. RBA_NEW is a value computed by an algorithm that RELOAD might be expected to call when building blocks/CIs. However if PACU is not used, then the computation could be performed as a segment is unloaded and RBA_NEW could be placed in the F_UNLOAD file for later use (the computation should use the new DBD.) RBA_NEW may not always increment if the following special reload options are used: dependent segment repositioning (POS—available in BMC product) and HDAM smoothing. At reload the randomizer Poisson distribution can be improved upon, resulting in less non-home roots and thus better performance. F_UNLOAD contains all information contained in the IMS DB, except temporary data that are a function of selected blocksize (e.g. FSEs, Bit Maps, fragments of DASD space less than 8 bytes long). F_UNLOAD logically is an IMS DB, in the sense that any operation possible against the DB can be performed against the file, although this could be a very slow process. Therefore F_UNLOAD could be converted to any other unload file format to drive other utilities.

As concurrent updates are allowed, some form of locking is required. While unloading record N, locks should be held on roots of records N−1, N, N+ for both Shadow Reorganization and Reorganization In Place (RIP). For RIP, locks may also be needed on all index CIs that have an RBA address of any segment in record N. This however has not been decided yet.

If using Shadow Reorganization, then locking may be GN next segment, and if segment is root of record N, issue a GHU on the segment. The GN should have released the root lock on N−1. From lockout view, simply using GHN for all segments would be equivalent. Thus most efficient approach can be taken. The distinction may not apply to whatever fast access method is used.

For every segment read by the above GN process an Unload record is created. A simple Unload file would be the entire set of these records written to an external file on tape or DASD. The Shadow Reorganization system would work if a simple Unload file were written by unload, however for various performance reasons once built by the GN process the Unload records may be processed in another way. Two basic options are: the records may be passed directly to a Reload process, rather than going via an external file; and the records may be split into two files MAIN and XREF, using IMSSEQ as common sequence field. MAIN includes the fields that would be required to do a Reorganization load if no concurrent updates were allowed. These fields may also be sufficient, even with concurrent updates, if the system has call level interception of the update calls. The MAIN file would be read in IMSSEQ sequence and the loads done. XREF fields are specifically to support Shadow Reorganization where updates are applied from IMS log intercepts. They may also be useful in supporting RIP. The XREF file would be read in IMSSEQ sequence and a subset of fields used to build an in-core XREF table to translate log records using old RBAs to new RBA actions. Issues may arise about size of the tables for large DBs, but options may exist to split the DB into multiple tables.

In the TOD field, an STCK value may be taken sometime while lock is held on root. Most logical way would be to do an STCK as soon as root lock obtained, and use this same value for all segments belonging to the root.

Flags may be needed to state which options on exact contents of record exist. For example, is user data compressed? Default may be to unload compressed data as is. Is this a Logical Child not containing key of logical parent? Default may be to unload LC as it is physically stored on DB, specifically adding an LP key would be major performance overhead. Is a PSEUDO prefix provided? Are there any other flags? Note that user data flags may determine if the unload file could be directly used as an initial load file (cannot if compressed or LP keys missing).

Of the RBA_*** fields, all that is logically required is RBA_OPS. The others can then be deduced using other fields and DBD: Segment Code plus DBD gives prefix size and layout; Segment Code plus DBD gives user data length, or states that ll at start of user data; and Delete byte has a bit set for split segments, then data pointer is appended to prefix. However lookups on these values may be required later when applying concurrent update changes, so for performance the calculations should be done one time here. Also note that calculations here may require zero elapsed time, as it should be possible to overlap with DB read I/O waits.

RBA_NEW is the RBA where prefix should go on reorganization. As a segment should not be reloaded split, and as no special lookups are required, only this single RBA is required.

All following fields are variable length. OFFSETS are just halfwords giving the starting offsets from the start of the record, of all fields following the first variable length field. Again this is a performance issue, the offsets can be computed from values in other fields plus the DBD.

PCBKEY is a fully concatenated key down from root. In regular DL/I call, IMS places this in PCB key feedback area. This is not the same as the IMSKEY.

The concatenation of SEGCODE, DELFLAG, and POINTERS is the IMS segment PREFIX. They are shown split here as various portions herein refer to them individually. Their meanings and structure are defined in IMS manuals. If the segment is split (PREFIX stored separate from DATA, due to updating a variable length segment and not having room to write back the data) then the "DELETE" flag has a bit set, and an additional data pointer is appended to the regular PREFIX POINTERS (minimum size of a variable length segment is 4 bytes, so there is always room to append a pointer if needed.)

PSEUDO is an IMS Prefix POINTERS containing the RBA of the target segment. The RBA may change on Reorganization. An alternative way to map the structure is to use the IMSSEQ of the target segment. These may not change on Reload and may have uses.

DATA is the user data. The default is to write it as physically recorded in the DB, i.e. if compressed leave compressed (if an index target the required key value is in PCBKEY), if an LC without LP key then do not retrieve LP key. By using a suitable exit, being compressed does not prevent file from being used for an initial load, however lack of an LP key does. Lack of LP key is fine for Reorganization load, as there necessarily exists a direct LP pointer in the prefix.

F_CALLI Repository File

The F_CALLI repository represents that mechanism for storing and retrieving the online IMS database updates that occur during a system online database reorganization job.

Due to the fact that both the system IMS Logger Exit and the system Call Intercept modules for DL/I replace/insert/delete calls may write data into the F_CALLI repository in real-time, one of the greatest concerns is that it perform very well in storing potentially massive amounts of data. At the same time, this repository should provide the kind of functionality required during the playback of updates when completing the system reorganization.

After the system has created a reorganized copy of the online IMS database, it may be necessary for the system to playback database updates captured and stored in the F_CALLI repository. To properly apply captured database updates, however, it is necessary that the system understand and handle the various forms of database update "rollbacks." For IMS applications, there are two basic forms of roll-back activity: transaction abends/full roll-backs (ROLL or ROLB) and user-defined partial roll-backs (SETS/ROLS).

The following is the preferred approach to the F_CALLI playback:

1. Database updates for playback purposes should be accessed by the database name (DBDNAME), using a "get-next" type of approach;
2. Within the scope of a specific database, the F_CALLI repository should organize database updates according to the primary IMS recovery token under which the updates were made;
3. As the DL/I call intercept modules may be recording updates by database name and primary recovery token in real-time, the F_CALLI repository should naturally store updates in their original, chronological order within the scope of individual primary recovery tokens (units of work);
4. Playback of updates may be chronological by primary recovery token in the order in which the primary recovery tokens were "committed" (all updates for a specific recovery token may be played back before moving on to the next recovery token, meaning that updates may not necessarily be played back in their original chronological order as updates from one unit or work relates to updates from another, concurrent unit of work);
5. F_CALLI should only return "committed" database updates during playback;
6. Within any given primary recovery token, updates are either committed, rolled back or still being processed (application is still running);

7. The F_CALLI repository API may internally reconcile SETS/ROLS situations, ensuring that only committed updates are returned during the playback phase of the system;
8. F_CALLI may handle ROLL and ROLB situations by flagging all updates for the associated primary recovery token as being rolled-back (these should not be returned during playback); and
9. The F_CALLI repository may internally keep track of updates as they are played back (it should not be necessary for the F_CALLI user to keep track of how to ask for the next chronological update).

The following codes in Table 5 are used for Entry intercept:—Y means data is provided in this call, and—P means data sitting within IMS since last Exit for a call to that DB.

TABLE 5

F_CALLI codes

| Field | Description | Avail at Entry? | Avail at Exit? |
|---|---|---|---|
| REGNID | Internal ID of region issuing call. | Y | Y |
| TOD | STCK value. | Y[1] | Y |
| TYPE | Entry, Exit, Part merge, Full merge | | |
| CALL | ISRT, GET, REPL, DLET, SETx, ROLLx, ABORT, COMMIT | Y | ? |
| STATUS | IMS returned status. In Exit point records. | N | Y |
| SEGNAME | Name of segment | Y - If ISRT P - If DLET, REPL | Y - If G** |
| PCBKEY | PCB key feedback | Y and/or P | Y[2] |
| RBA | RBA of segment, if PCBKEY not available. May be converted to PCBKEY later | N | Y |
| ROOTSEQ | GN collating sequence of root Compute from PCBKEY + DBD | as for PCBKEY | as for PCBKEY |
| DATA | User data | Y - If ISRT, REPL | Y - If G** but not used |

[1]An STCK may exist here, as this value may be used later in a sort for some implementations. However a lock may exist on root at time of STCK in all cases. Thus this value should not be used in deciding if an Update APPLY is needed.
[2]May not be available. In that case the RBA may later be used to lookup PCBKEY in an XREF table.

The above represents all data that goes into the stack. Many records may get filtered to any F_CALLI file.

Locking Requirements

IMS is a complex system. Its integrity control includes locks immediately visible and obvious to users. These are on sets of segments. Additional locks are generated automatically. Many users are not aware of them, but they are protecting things like index records, pointer chains, and shared CIs. More advanced users are aware of these. Internal locks and latches that IMS desires for its own work are also provided. These are generally only of interest to systems programmers and DBAs.

In doing system and HPR design the main concern is the locks immediately visible and obvious to the users. The existence of the automatic locks is taken into account in places, but mainly to note that IMS is providing some desirable protection. An important point is that both the visible and automatic locks are locking logical objects ultimately defined via some user data value. Internally the created lock may use an RBA, but this RBA was located starting, maybe many steps back, from some user data key value. The system and HPR are considered users by IMS, and users only see locks on logical objects. When creating ICs and reading logs, the system is dealing with physical byte strings, hence from the user view there is no concept of locking. Programs accessing these byte strings rarely know the logical meaning of a string, and hence would not know what to lock. These strings record actions that have already happened. Any locking requirements have already been fulfilled in creating the strings.

Unloading uses DL/I GN calls (or equivalent) so the system may do required locking. See later section on Area Independence for discussion on locking just N vs locking N−1 to N+1. To obtain the locks if using a BMP with straight DL/I calls, the always-required read locks on N are placed automatically. If it is decided to also hold locks on N+1 and N−1, then a Q command and DEQ calls are added.

It is however probable that, for performance, a standard BMP may not be used, and that segments may be read using an HSSR type approach or an existing fast unload batch tool. That approach may not by itself add the required locks. Thus additional lock calls may be desired. Then it may be desirable to add the locks via separate root calls, maybe via cross memory posts from the batch tool to a BMP reading roots only, or by adding a separate DCB into the BMP.

Figure 13:
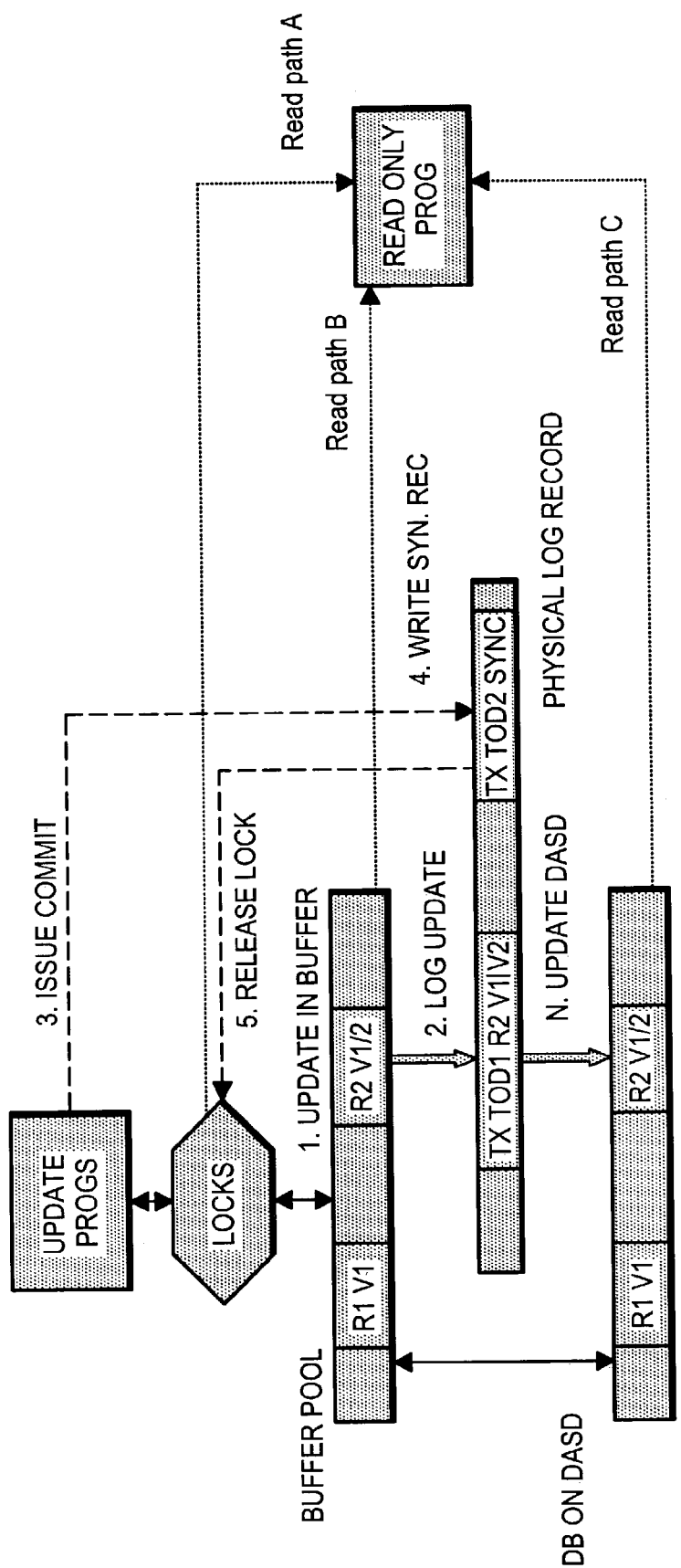
FIG. 13 shows the interaction between locks and data according to one embodiment of the present disclosure.

For locking alone, the technique is not important, however there are separate issues of buffer pool views as shown in FIG. 13. In HPR FIG. 13 is used to show how byte string access via paths A, B or C can be used. The point is that, as byte string operations have no concept of logical content or locking, a temporary read of inconsistent data is not important, and everything may be valid at the end of the run. In this system, the situation is different. Logical content may be valid at all times. The system may follow pointers at time of access. As stated above, the locks may be in place. However, these would not protect against seeing invalid data via path C. Thus the system may access data via path B. This means using the same buffer pool that is used by the IMS concurrent update programs. This is the technique used by HSSR.

For reload and apply batch updates, there is no locking since these are batch activities against the new DB before it is put online.

Timing Sequences

Figure 14:
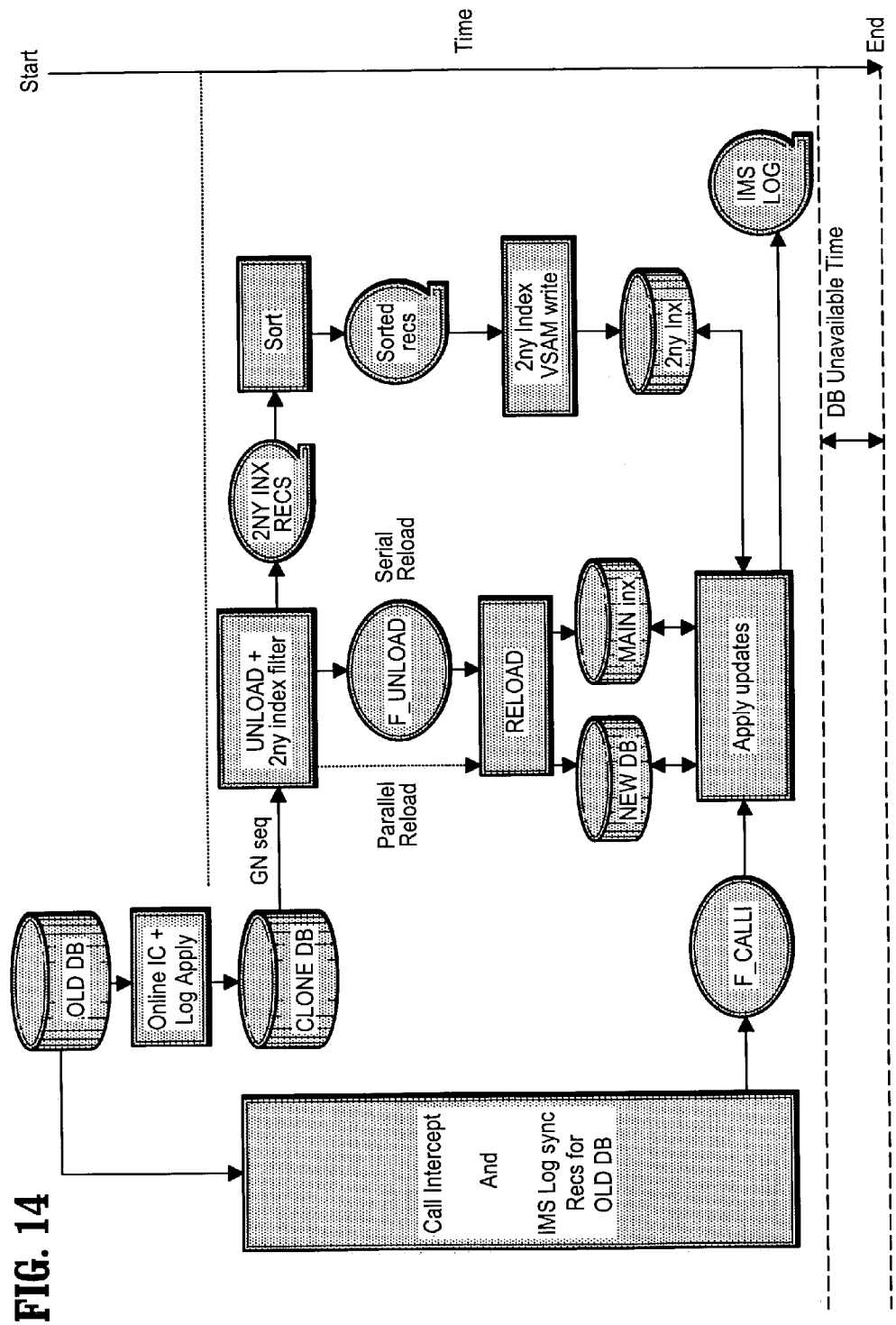
FIG. 14 shows relative timings of the online reorganization system and method according to one embodiment of the present disclosure.
Figure 15:
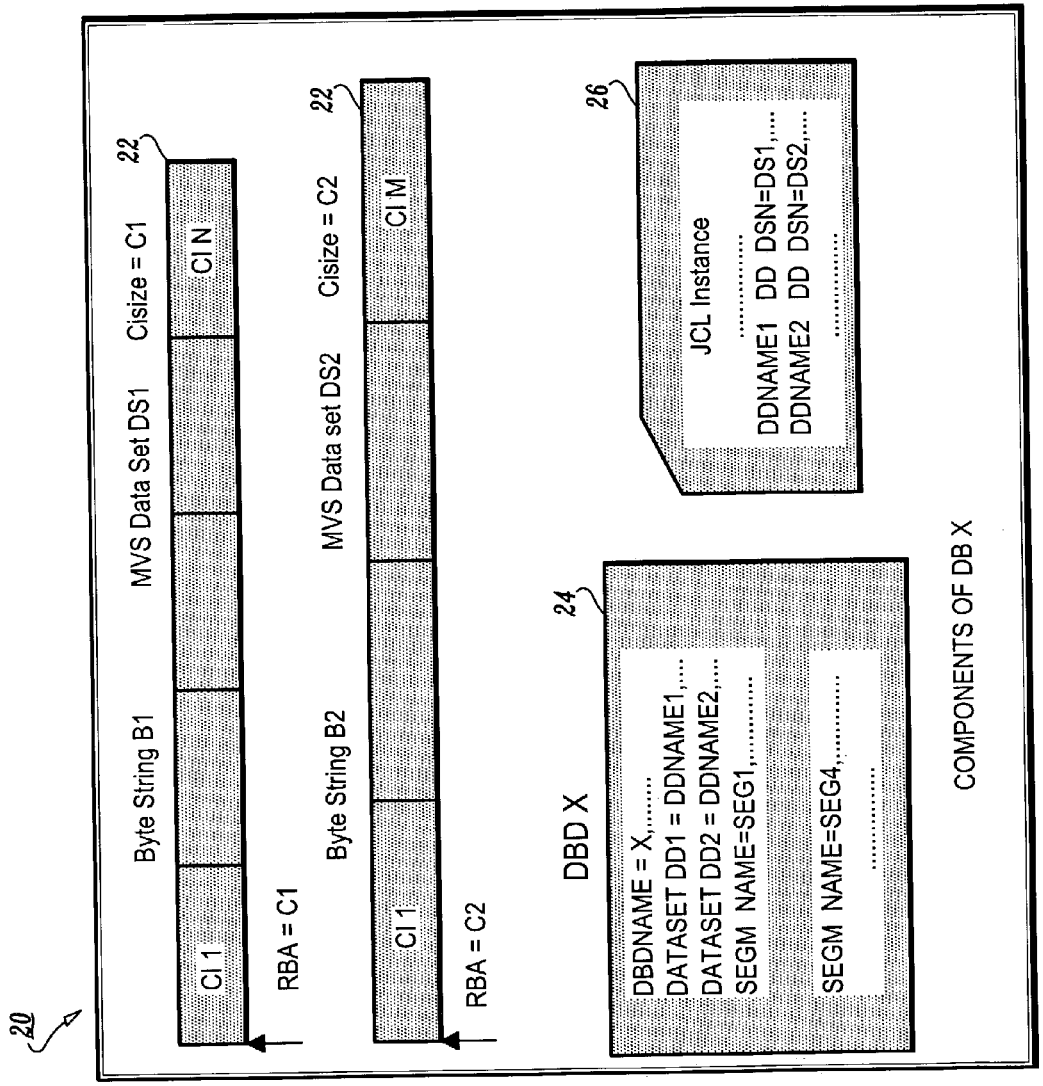
FIG. 15 depicts an IMS database structure.
Figure 16:
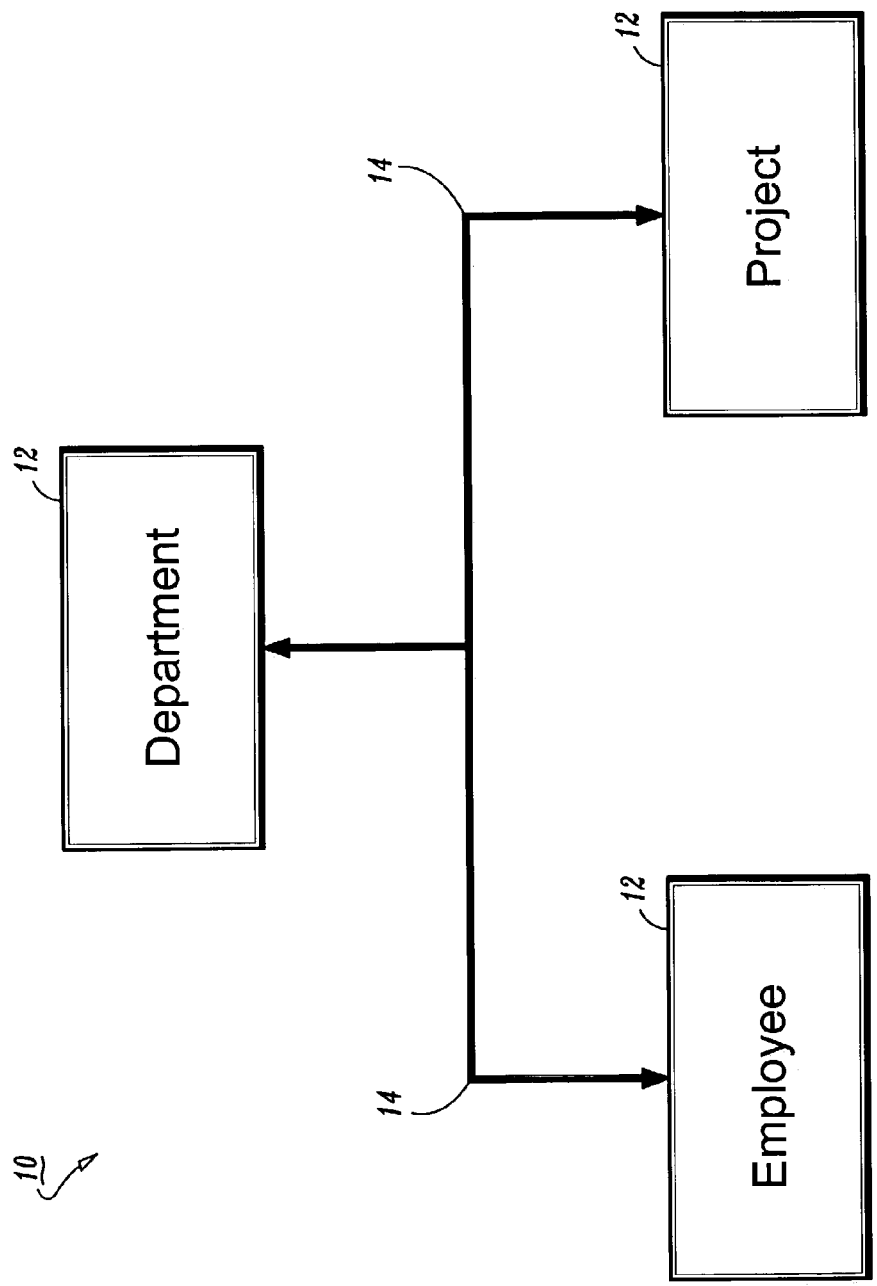
FIG. 16 depicts an example of a hierarchical diagram.

FIG. 14 shows relative timings of the online reorganization system and method according to one embodiment of the present disclosure. At start a CLONE is created of OLD DB, while it is online and being updated. A syn time T1 is established, and a utility such as online copy, DFSUICP0, is run to create a "fuzzy" copy on DASD. Time T2 is established, at which copy ends. Call Intercept and IMS log intercept are activated at or before T2. Apply of all IMS log updates to fuzzy copy occurs, to create a CLONE as of T2.

A modified version of existing IDI utilities is run to unload clone in GN sequence, creating logical file F_UNLOAD. F_UNLOAD contains RBA_NEW, so secondary index records can be written at this time. IBM & BMC use non reload algorithms that give non-repeatable results, and must wait till after RELOAD to create this file. If running Serial Reload, this would mean that secondary index sort and load cannot start till after RELOAD ends, which would delay start of Apply Updates and extend elapsed time. Routine creating secondary index records must have access to any sparse indexing module. It is optional whether RELOAD runs in Serial mode (waits till UNLOAD complete and reads physical file F_UNLOAD) or Parallel mode (is passed F_UNLOAD records via storage as soon as they are created). RELOAD creates main DB by building CIs/Blocks and writing as a sequential file. No IMS involved, except that program will read source of new DBD to discover formatting requirements. If HIDAM, the main index is created in parallel by VSAM KSDS writes, again no IMS involved. Apply issues regular DL/I calls to apply all updates captured by Call Interface. This will likely not start until RELOAD (Parallel or Serial) has finished, including waiting until any secondary indexes created. If secondary index records created in UNLOAD, then they should have been recreated by time that RELOAD finishes, or else must wait. Updates will be applied in exactly the same sequence (defined by Log syn records) as applied to old DB. All captured updates may be applied. In future it may be possible to apply updates in parallel to RELOAD, in that case only about 50% (those for records already unloaded) will be applied, the filtering will be done by the Call Intercept code which will monitor UNLOAD progress. Call Intercept will continue to add to F_CALLI in parallel with APPLY reading records off this file. APPLY is expected to outrun the rate of adding, and process will continue until there is only about one record left on F_CALLI. Then OLD DB is stopped, final F_CALLI records applied, DBs switched, and new DB with indexes brought online.

Table 6 illustrates the maximum parallelism allowed when using BMP. All times are sync times, so time of /DBR and /STA are logically equal. Refer to FIG. 2 for the flow described.

TABLE 6

Maximum parallelism using BMP.

| Time | Main Activities Old DB | Main Activities New DB | Other Parallel Activities | DB Unavailable |
|---|---|---|---|---|
| T1 | /DBR old Start CALL INTERFACE | | | Y Y |
| T1 | /STA old Start Unload old DB | | Start old DB IC update | |
| | | Start RELOAD new DB Start parallel fuzzy IC Start Apply (Optional) | -Index create -2ndy index file write | |
| T2 | End Unload | | | |
| | | End RELOAD End fuzzy IC new DB | -Index exists Sort file & load 2ndy indexes | |
| | | Apply most remaining updates | | |
| T3 | /DBR old DB End CALL INTERFACE | Apply final updates, end Start CALL INTERFACE Start fuzzy IC update | -2ndy indexes exist | Y Y |
| T3 | Start HASH build End hash build Compare new, old hash | /STA new DB End new DB IC - T3 New DB known | End old DB IC - T3 | |

TABLE 6-continued

Maximum parallelism using BMP.

| Time | Main Activities Old DB | Main Activities New DB | Other Parallel Activities | DB Unavailable |
|---|---|---|---|---|
| | | OK or known to be bad End CALL INTERFACE | | |

Apply most remaining updates assumes that Apply speed outruns speed at which new entries are added to queue, as new entries are a subset of activities against live DB. Hence continue till about one update is on queue, before issuing /DBR. If not doing Parallel Apply, then Start Apply is also at this point. Batch create new DB IC simply applies in batch all IMS log updates, against new DB, generated by all Apply activity in period T2–T3. The Old and new DB ICs have log updates applied in batch to previous old IC or fuzzy new IC. Start/end Call Interface means Call Interface and Log Exit.

Table 7 illustrates the minimum parallelism when using BMP

TABLE 7

Minimum parallelism using BMP.

| Time | Main Activities Old DB | Main Activities New DB | Other Parallel Activities | DB Unavailable |
|---|---|---|---|---|
| T0 | /DBR old | | | Y |
| T0 | /STA old Perform fuzzy IC Apply Log updates | | | Y |
| T1 | /DBR old Finish log apply, Old DB IC-T1 Start CALL INTERFACE | | | Y Y |
| T1 | /STA old Start Unload old DB | | | |
| | | Start RELOAD new DB | -Index create -2ndy index file write | |
| T2 | End Unload | End RELOAD | | |
| | | | -Start fuzzy new DB IC -Index exists Sort file & load 2ndy indexes | |
| | | Start Apply Apply updates | | |
| T3 | /DBR old DB End CALL INTERFACE | End Apply Start CALL INTERFACE | -2ndy indexes exist | Y |
| | | | Wait end of fuzzy IC-T3 | Y |
| T3 | Start HASH build End hash build Compare new, old hash | /STA new DB | | |
| | | New DB known OK or known to be bad End CALL INTERFACE | -Update old IC from T1 to T3 | |

In start RELOAD, it is assumed that RELOAD may run in parallel to Unload. It is assumed that taking fuzzy IC of entire DB may require longer than doing apply. Hence /STA may be delayed. DB unavailable time would increase further if wait till Apply ends, before starting a clean IC.

By time T1 a CIC as of T1 may exist. This can be created via online copy (as shown in minimum parallelism) or offline as described in section Produce CIC.

After T1 the allowed time sequences are the same as shown for BMP. The only difference is that as described in the section Filtering ROOTSEQ, using an IC as source of unload requires 100% of updates to be applied.

Global Parameter Processing

The system supports global parameter processing, which allows use of certain installation standard keyword definitions in a partitioned data set (PDS) member or sequential data set. Once defined, these are used to supplement the keyword parameters coded in the JCL control statements.

To activate this feature, the installation steps may be followed. This may ensure no JCL changes are required for any reorganization jobs, and the installation-defined global parameters may be used. Alternatively, a DD statement may be added for IDIPARM to any job step, which points to a data set containing global keyword parameters. These may supplement the keyword definitions coded in the JCL only for that job step.

If the feature has been activated for all jobs, and a DD statement for IDIPARM is coded, the DD statement may override the standard definitions established at installation time. Thus, it is possible to define a set of global parameters that may be used for all jobs, and to override these for one or several jobs if desired.

Any system parameters may be coded in the global parameter data set. However, there may be some parameters that would not be logical to include in a global definition. For example, DBDNAME=would not normally apply to all system reorganization jobs. Careful consideration may be given as to which parameters may be specified globally.

Also, it is important to note that any command verbs coded within the global parameter data set may be ignored, since the function to be performed has already been determined.

The user may wish to code a command verb in the global parameter data set for documentation purposes. For example, the samples provided with the CA Solutions for IMS for OS/390 products have a FUNCTION=keyword, but these are ignored during processing.

Global Parameter Processing Hierarchy

Global parameter processing is invoked after reading all keyword parameters that have been coded in the JCL for a function. At that point, the global parameters are read, and any keywords that were not specified in the JCL may be used to supplement the parameter set for the current run. For example, if the global parameter data set contains the keyword ABENDDUMP=NO, but the JCL contain ABENDDUMP=YES, the final setting is ABENDDUMP=YES. If the global parameter data set contains ABENDDUMP=YES, and the JCL does not contain ABENDDUMP, the final setting is ABENDDUMP=YES.

Global Processing Method of Operation

At the point in the system where all control statements for a function have been processed, the global parameter processing proceeds as described below.

If a DD statement is present for IDIPARM, and the data set is a sequential file, that data set is opened, the control statements within it are processed as global parameters, and the requested function is performed with the parameter set including both the JCL and global parameters.

If a DD statement is present for IDIPARM, and the data set is fully qualified PDS with a member name, the data set is opened. Then, the control statements within it are processed as global parameters. The requested function is performed with the parameter set, including both the JCL and global parameters.

If a DD statement is present for IDIPARM, and the data set is a PDS with no member name, the data set is opened using a standard member name for the function being performed. The control statements within it are processed as global parameters, and the requested function is performed with the parameter set, including both the JCL and global parameters.

If there is no DD statement for IDIPARM, the system looks in STEPLIB for a DFSMDA load module named IDIPARM. If this is not found, then no global parameter processing is done. If this load module is found, the data set name it defines is dynamically allocated. If the data set defined is a PDS, the system opens it using a member name based on the requested function and the control statements within it are processed as global parameters. Finally, the requested function is performed with the parameters set, including both the JCL and global parameters.

In addition, an informational message is printed when the data set is allocated, which shows both the data set name and the member name that were used. In all cases, before attempting to open a partitioned data set, the system performs an internal check to ensure that the required member is present in the library. If not, a message is issued. This avoids SO13 ABENDS. If the job step contained a DD statement for a fully-qualified PDS, with a member name, and that member is not found, the job step terminates. However, if the system determined the member name based on the function being performed, then global parameter processing may simply be bypassed.

During the processing of the global parameters, any keywords found which have already been specified in the JCL for the job step may be ignored. All other keywords may control the processing of the current function just as if they had been entered in the JCL.

All control statements found in the global parameter data set may be clearly identified and printed on the output MSGS file, following the listing of the JCL control statements, so it is clear what keyword values were used for a function.

Any serious errors encountered during processing of the global parameters may result in error messages, and termination of the job step.

Global Parameter Syntax

Syntax rules for global parameters are slightly different than for normal JCL control statements. Control statements can be coded in IDI or AMS format for all control statements. This also applies to the control statements coded in global parameters data sets.

Global parameters can be coded as IDI or AMS syntax, regardless of the format used in the JCL. The system may recognize and correctly process the global parameters. It is still desirable to use one syntax type for all control statements in the JCL, and one syntax type for all control statements in the global parameter data set.

All other syntax rules remain the same as for normal JCL control statements.

The present system and method may automatically rename all data sets of the new and old database. The database may be stopped only twice during the reorganization process. All "indexes" for the database are built. All of the information required to build the indexes may be gathered during the reload and all of the indexes may be built in parallel.

The system method may image copy and analyze the database after the reload process is complete. This process may run in parallel with the above steps.

The method of the present disclosure provides fast unload, reload, and reorganization of IMS databases while being accessed by IMS applications. It also provides rebuilding of existing indexes. With the method of the present disclosure, backup copies of an IMS database can be created when the database is used or updated concurrently by an online IMS system. A database may be reorganized in a single job step. Downtime can be greatly reduced during reorganizations to provide close to full time data availability. Furthermore, concurrent read and update of the original database can be provided by other IMS transactions and BMPs.

In this way, the present disclosure provides a method and system for reorganizing an online database while allowing read and write access to the database during the reorganization. An online database may therefore be reorganized while available for update to the IMS DBMS system.

The specific embodiments are illustrative, and it may be appreciated that many variations on these embodiments may be introduced without departing from the spirit of the disclosure. For example, elements and/or features of different illustrative embodiments may be combined with each other and/or substituted for each other within the scope of this disclosure. The embodiments are presented for the purpose of illustration only and may not be read as limiting the disclosure.

We claim:

1. A computer-implemented method for online reorganization of an existing database that occurs while read and update activity of the existing database continues, the method comprising the steps of:
   unloading the existing database;
   reloading the existing database to a shadow database;
   building shadow database indexes;
   capturing updates for the existing database while the existing database is reloading into the shadow database;
   applying the captured updates to the shadow database;
   taking the existing database offline;
   finalizing the shadow database with any remaining updates when the existing database is taken offline;
   running a lesser set of calls on the existing database to obtain a first result;
   running the lesser set of calls on the finalized shadow database to obtain a second result;
   comparing the first result with the second result;
   placing the finalized shadow database online if the first result matches the second result; and
   placing the existing database online if the first result does not match the second result.

2. The computer-implemented method for online reorganization of an existing database that occurs while read and update activity of the existing database continues as set forth in claim 1, wherein the existing database is directly reloaded to the shadow database so that there is no intermediary file.

3. The computer-implemented method for online reorganization of an existing database that occurs while read and update activity of the existing database continues as set forth in claim 1, the method further comprising:
   creating a first intermediary image copy of the existing database when the existing database is directly reloaded to the shadow database.

4. The computer-implemented method for online reorganization of an existing database that occurs while read and update activity of the existing database continues as set forth in claim 3, the method further comprising the step of:
   analyzing the existing database when creating the first intermediate image copy of the existing database.

5. The computer-implemented method for online reorganization of an existing database that occurs while read and update activity of the existing database continues as set forth in claim 1, the method further comprising the step of:
   creating a final image copy of the existing database when the shadow database is finalized.

6. Computer software for online reorganization of an existing database that occurs while read and update activity of the existing database continues, the computer software residing on a computer-readable medium and comprising instructions for causing a computer to perform the following operations:
   unload the existing database;
   reload the existing database indexes;
   build shadow database indexes;
   capture updates for the existing database while the existing database is reloading into the shadow database;
   apply the captured updates to the shadow database;
   take the existing database offline;
   finalize the shadow database with any remaining updates when the existing database is taken offline;
   run a lesser set of calls on the existing database to obtain a first result;
   run the lesser set of calls on the finalized shadow database to obtain a second result;
   compare the first result with the second result;
   place the finalized shadow database online if the first result matches the second result; and
   place the existing database online if the first result does not match the second result.

7. The computer software for online reorganization of an existing database that occurs while read and update activity of the existing database continues, the computer software residing on a computer-readable medium and comprising instructions for causing a computer to perform the operations as set forth in claim 6, wherein the existing database is directly reloaded to the shadow database so that there is no intermediary file.

8. The computer software for online reorganization of an existing database that occurs while read and update activity of the existing database continues, the computer software residing on a computer-readable medium and comprising instructions for causing a computer to perform the operations as set forth in claim 6, further comprising instructions for causing a computer to perform the following operations:
   create a first intermediary image copy of the existing database when the existing database is directly reloaded to the shadow database.

9. The computer software for online reorganization of an existing database that occurs while read and update activity of the existing database continues, the computer software residing on a computer-readable medium and comprising instructions for causing a computer to perform the operations as set forth in claim 8, further comprising instructions for causing a computer to perform the following operation:

analyze the existing database when creating the first intermediate image copy of the existing database.

10. The computer software for online reorganization of an existing database that occurs while read and update activity of the existing database continues, the computer software residing on a computer-readable medium and comprising instructions for causing a computer to perform the operations as set forth in claim 6, further comprising instructions for causing a computer to perform the following operation:

create a final image copy of the existing database when the shadow database is finalized.

11. A computer-readable medium including computer executable code for performing online reorganization of an existing database that occurs while read and update activity of the existing database continues, the computer-readable medium comprising:

code for unloading the existing database;
code for reloading the existing database to a shadow database;
code for building shadow database indexes;
code for capturing updates for the existing database while the existing database is reloading into the shadow database;
code for applying the captured updates to the shadow database;
code for taking the existing database offline;
code for finalizing the shadow database with any remaining updates when the existing database is taken offline;
code for running a lesser set of calls on the existing database to obtain a first result;
code for running the lesser set of calls on the finalized shadow database to obtain a second result;
code for comparing the first result with the second result;
code for placing the finalized shadow database online if the first result matches the second result; and
code for placing the existing database online if the first result does not match the second result.

12. The computer-readable medium including computer executable code for performing online reorganization of an existing database that occurs while read and update activity of the existing database continues as set forth in claim 11, wherein the existing database is directly reloaded to the shadow database so that there is no intermediary file.

13. The computer-readable medium including computer executable code for performing online reorganization of an existing database that occurs while read and update activity of the existing database continues as set forth in claim 11, the computer-readable medium further comprising:

code for creating a first intermediary image copy of the existing database when the existing database is directly reloaded to the shadow database.

14. The computer-readable medium including computer executable code for performing online reorganization of an existing database that occurs while read and update activity of the existing database continues as set forth in claim 13, the computer-readable medium further comprising:

code for analyzing the existing database when creating the first intermediate image copy of the existing database.

15. The computer-readable medium including computer executable code for performing online reorganization of an existing database that occurs while read and update activity of the existing database continues as set forth in claim 11, the computer-readable medium further comprising:

code for creating a final image copy of the existing database when the shadow database is finalized.

* * * * *